United States Patent
Hertzfeld

(10) Patent No.: US 7,920,149 B2
(45) Date of Patent: Apr. 5, 2011

(54) ROLLBACK IN A BROWSER

(75) Inventor: Andrew Hertzfeld, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/621,350

(22) Filed: Nov. 18, 2009

(65) Prior Publication Data

US 2010/0115440 A1 May 6, 2010

Related U.S. Application Data

(63) Continuation of application No. 11/484,891, filed on Jul. 10, 2006, now Pat. No. 7,633,510.

(60) Provisional application No. 60/798,008, filed on May 5, 2006.

(51) Int. Cl.
| | |
|---|---|
| G09G 5/00 | (2006.01) |
| G06F 17/00 | (2006.01) |
| G06F 17/30 | (2006.01) |
| G06F 3/048 | (2006.01) |
| G06F 15/16 | (2006.01) |

(52) U.S. Cl. ........ 345/619; 358/448; 358/452; 358/537; 382/254; 382/276; 700/83; 700/87; 709/201; 709/203; 715/700; 715/255; 715/764; 715/810

(58) Field of Classification Search .................. None
See application file for complete search history.

(56) References Cited

U.S. PATENT DOCUMENTS

| | | | |
|---|---|---|---|
| 6,532,312 B1 | 3/2003 | Corkran | |
| 6,803,923 B1 | 10/2004 | Hamburg | |
| 6,844,885 B2 | 1/2005 | Anderson et al. | |
| 6,961,905 B1 | 11/2005 | Cover et al. | |
| 6,983,416 B1 * | 1/2006 | Bae et al. | 715/234 |
| 7,631,252 B2 * | 12/2009 | Hertzfeld et al. | 715/201 |
| 7,631,253 B2 * | 12/2009 | Hertzfeld et al. | 715/201 |
| 7,633,510 B2 * | 12/2009 | Hertzfeld | 345/619 |
| 7,634,715 B2 * | 12/2009 | Hertzfeld et al. | 715/201 |
| 2002/0073214 A1 | 6/2002 | Iinuma | |

(Continued)

FOREIGN PATENT DOCUMENTS

WO  WO 2007/131233  11/2007

OTHER PUBLICATIONS

Kalyanpur, A., et al., "Swoop: A 'web' ontology editing browser," Elsevier Science, Jul. 30, 2005, pp. 1-20.

(Continued)

*Primary Examiner* — Wesner Sajous
(74) *Attorney, Agent, or Firm* — Fish & Richardson P.C.

(57) ABSTRACT

Methods, apparatus, computer program products and systems are provided for editing an image. One method includes editing, by a processor, an image including maintaining a list of transformations applied to the image including a last transformation; receiving a selection from a user to rollback a transformation, the selection not including the last transformation, where receiving a selection includes receiving a selection from the list of transformations that include plural selections that are not contiguous in an order in which the transformations were applied; generating, by the processor, a unique identifier associated with the edited image without the selection, the unique identifier including data identifying the image and all transformations to be applied to the image; and after receiving a request for an edited image, the request including the unique identifier, transmitting the edited image to a requesting device.

6 Claims, 19 Drawing Sheets

U.S. PATENT DOCUMENTS

| | | |
|---|---|---|
| 2003/0067560 A1 | 4/2003 | Suzuki |
| 2003/0069560 A1 | 4/2003 | Adamis et al. |
| 2003/0088831 A1 | 5/2003 | Bauer et al. |
| 2003/0098862 A1 | 5/2003 | Hunt et al. |
| 2003/0146920 A1 | 8/2003 | Tezuka et al. |
| 2004/0148576 A1 | 7/2004 | Matveyenko et al. |
| 2004/0215719 A1 | 10/2004 | Altshuler |
| 2005/0102629 A1 | 5/2005 | Chen et al. |
| 2005/0102630 A1 | 5/2005 | Chen et al. |
| 2007/0030506 A1 | 2/2007 | Takabayashi et al. |
| 2007/0260979 A1 | 11/2007 | Hertzfeld et al. |
| 2008/0140705 A1 | 6/2008 | Luo |
| 2008/0225057 A1 | 9/2008 | Hertzfeld et al. |
| 2008/0225058 A1 | 9/2008 | Hertzfeld et al. |
| 2008/0275922 A1 | 11/2008 | Hertzfeld et al. |

OTHER PUBLICATIONS

Phelps, T.A., et al., "The multivalent browser: A platform for new ideas," DocEng '01: Proceedings of the 2001 symposium on document engineering, Nov. 2001, pp. 58-67.

Saund, E., et al, "Perceptually-supported imagine editing of text and graphics," UIST '03: Proceedings of the 16$^{th}$ annual ACM symposium on user interface software and technology, Nov. 2003, pp. 183-192.

Schwartz, S., "Organizing and editing your photos with picasa," Peachpit Press, May 2005, pp. i-svi, 1-142.

International Search Report and Written Opinion in Application No. PCT/US2007/068395, mailed Sep. 24, 2008.

USPTO Non-final Office Action in U.S. Appl. No. 11/484,322, mailed Sep. 11, 2008, 19 pages.

Fish & Richardson P.C., Amendment in Reply to Action dated Sep. 11, 2008, in U.S. Appl. No. 11/484,322, filed Feb. 11, 2009, 15 pages.

USPTO Non-final Office Action in U.S. Appl. No. 11/484,337, mailed Sep. 11, 2008, 29 pages.

Fish & Richardson P.C., Amendment in Reply to Action dated Sep. 11, 2008, in U.S. Appl. No. 11/484,337, filed Feb. 11, 2009, 17 pages.

USPTO Non-final Office Action in U.S. Appl. No. 11/484,323, mailed Sep. 12, 2008, 20 pages.

Fish & Richardson P.C., Amendment in Reply to Action dated Sep. 12, 2008, in U.S. Appl. No. 11/484,323, filed Feb. 12, 2009, 16 pages.

USPTO Final Office Action in U.S. Appl. No. 11/484,322, mailed Apr. 2, 2009, 23 pages.

Fish & Richardson P.C., Amendment in Reply to Action dated Apr. 2, 2009, in U.S. Appl. No. 11/484,322, filed Jun. 17, 2009, 10 pages.

USPTO Final Office Action in U.S. Appl. No. 11/484,337, mailed Apr. 3, 2009, 35 pages.

Fish & Richardson P.C., Amendment in Reply to Action dated Apr. 3, 2009, in U.S. Appl. No. 11/484,337, filed Jun. 17, 2009, 17 pages.

USPTO Final Office Action in U.S. Appl. No. 11/484,323, mailed Apr. 3, 2009, 25 pages.

Fish & Richardson P.C., Amendment in Reply to Action dated Apr. 3, 2009, in U.S. Appl. No. 11/484,323, filed Jun. 17, 2009, 12 pages.

* cited by examiner

ROLLBACK IN A BROWSER

CROSS-REFERENCE

This application is a continuation application of U.S. patent application Ser. No. 11/484,891, filed Jul. 10, 2006, which claims the benefit of U.S. Provisional Patent Application No. 60/798,008, filed May 5, 2006—both of which are incorporated herein by reference in their entirety.

TECHNICAL FIELD

This document relates to image manipulation.

BACKGROUND

A web browser is a software application that may enable a user to display and interact with text, images, and other information typically located on a web page stored in a web server on the World Wide Web or a local area network. Popular browsers available for personal computers include Microsoft Internet Explorer, Mozilla Firefox, Opera, Netscape, and Apple Safari. A conventional web browser may use a hypertext transfer protocol (HTTP) to transfer or convey information with a server. A web browser may access resources stored in a web server, which can store or create resources such as hypertext markup language (HTML) files and images. A web server may operate by accepting HTTP requests from the network, and providing an HTTP response to the requester (e.g., the web browser). The HTTP response typically consists of an HTML document, but can also be a raw text file, an image, or other type of document.

SUMMARY

In one aspect a method is provided that includes editing an image in a browser including maintaining a list of transformations applied to the image including a last transformation, receiving a selection from a user to rollback a transformation, the selection not including the last transformation, generating a unique identifier associated with the edited image without the selection and requesting a page using the unique identifier.

In another aspect, an apparatus is provided that includes means for rolling back transformations applied to an image in a browser including: means for selecting one or more previously invoked transformations applied to the image, means for generating a unique identifier associated with the image to include all previously applied transformations except the selected transformations, and means for requesting an image using the unique identifier.

In another aspect a method is provided that includes selecting an image for editing, the image being presented in a browser, editing the image in accordance with user instructions including presenting an edited version of the image in the browser, and undoing one or more edits applied to the image other than a last edit where undoing includes transmitting edit data to a server to allow the server to create a modified image. The edit data can include a unique identifier that identifies the image and transformations to be applied to edit the image not including the edits that are to be undone.

In another aspect a method is provided that includes providing an image in a browser, triggering an invocation of an editor in the browser, displaying an editor in the browser, the editor including a control for invoking one or more transformations be applied to the image, receiving user input to apply one or more transformations to the image, receiving user input to undo one or more of the transformations applied to the image, including one or more transformations that have not been applied in a sequential order and providing transformation data to a server including information defining the one or more transformations not undone.

In another aspect an apparatus is provided that includes an editor for editing an image in a browser, a list for compiling transformations to be applied to the image by the editor, a rollback processor for receiving a selection of transformations to rollback from the list and generate a unique identifier including data identifying the image and transformations in the list that are still to be applied to the image after rollback and a browser for requesting a modified image using the unique identifier.

In another aspect a computer program product in a medium is provided including instructions for causing a computer to edit an image in a browser, compile a list of transformations to be applied to the image, receive a selection of transformations to rollback from the list and generate a unique identifier including data identifying the image and transformations in the list that are still to be applied to the image after rollback and request a modified image using the unique identifier.

In another aspect a computer program product in a medium is provided that includes instructions for causing a computer to provide an image in a browser, trigger an invocation of an editor in the browser, display an editor in the browser, the editor including a control for invoking one or more transformations be applied to the image, receive user input to apply one or more transformations to the image, receive user input to undo one or more of the transformations applied to the image, including one or more transformations that have not been applied in a sequential order and provide transformation data to a server including information defining the one or more transformations not undone.

In another aspect, a computer program product in a medium is provided that includes instructions for causing a computer to select an image for editing, the image being presented in a browser, edit the image in accordance with user instructions including presenting an edited version of the image in the browser and undo one or more edits applied to the image other than a last edit, undoing including transmitting edit data to a server to allow the server to create a modified image the edit data including a unique identifier that identifies the image and transformations to be applied to edit the image not including the edits that are to be undone.

In another aspect a computer program product in a medium is provided that includes instructions for causing a computer to edit an image in a browser including maintaining a list of transformations applied to the image including a last transformation, receive a selection from a user to rollback a transformation, the selection not including the last transformation, generate a unique identifier associated with the edited image without the selection and request a page using the unique identifier.

DESCRIPTION OF DRAWINGS

These and other aspects will now be described in detail with reference to the following drawings.

Like reference symbols in the various drawings indicate like elements.

DETAILED DESCRIPTION OF ILLUSTRATIVE EMBODIMENTS

Figure 1A:
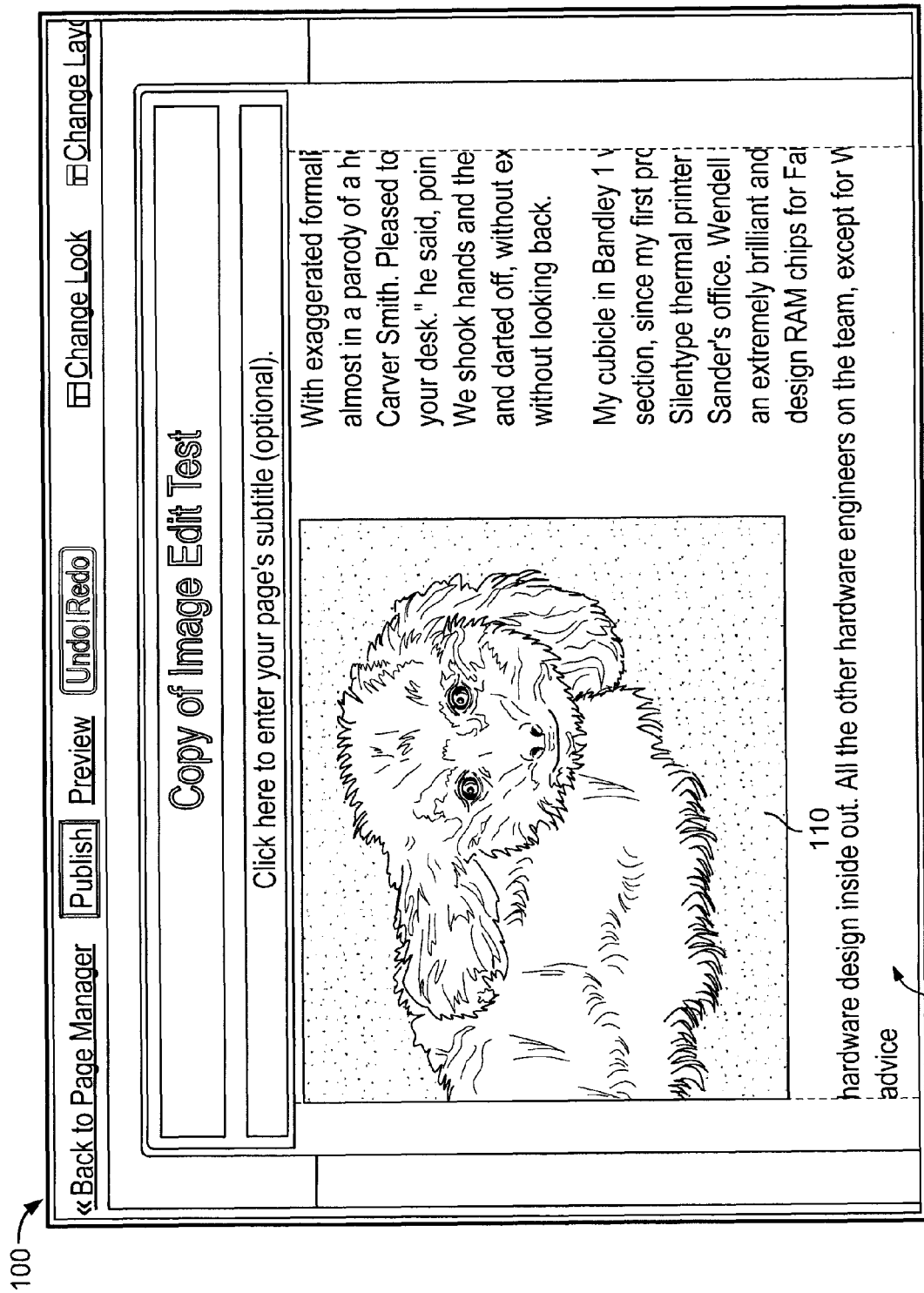
FIGS. 1A-1B collectively show an exemplary user interface and an exemplary system that are associated with a page creating process executing in a browser that is capable of constructing a webpage.

A method, tools and system for editing images in a browser are provided. The method and tools can be implemented in a browser executing on a client device. The method and tools can be stand alone or part of another application or process. In one implementation, the methods and tools are implemented as part of a page creating process that is executing in a browser on a client device, such as Google Page Creator. FIG. 1A shows an exemplary user interface associated with a page creating process executing in a browser 100 that is capable of constructing a webpage. The page creating process may be of the form of a page that is loaded and executed in a web browser (e.g., Internet Explorer, Firefox, Opera, Safari, etc.). For example, a user may load the page creating process using a web browser to connect to a web page in a server. After the page creating process is loaded into a client device, the page creating process may construct web pages using capability provided by the web browser. For example, the page creating process may construct web pages by performing operations implemented in a markup language, such as HTML, and/or a scripting language embedded in a webpage, such as JavaScript, JScript, or ECMAScript. In the example shown, a user may use the page creating process to edit and publish a webpage 105. Using the browser 100, the user may directly enter text into the webpage 105, change the layout of the webpage 105, change the look of the webpage 105, and/or add or modify images in the webpage 105. As used herein, the term "process" refers to a combination of one or more functions that can be implemented in hardware, software, firmware and any combination of the same or the like.

In this example, the webpage 105 includes an image 110. In some implementations, the page creating process includes an image editor. For example, the user can use the image editor to crop the image 110, remove red eye from the image 110, apply other effects (e.g., brighten, mash-up, sharpen, etc.) to the image 110, and revert one or more applied effects from the image 110. In some implementations, some image editing processes performed on the image 110 do not require interaction with a server.

Figure 1B:
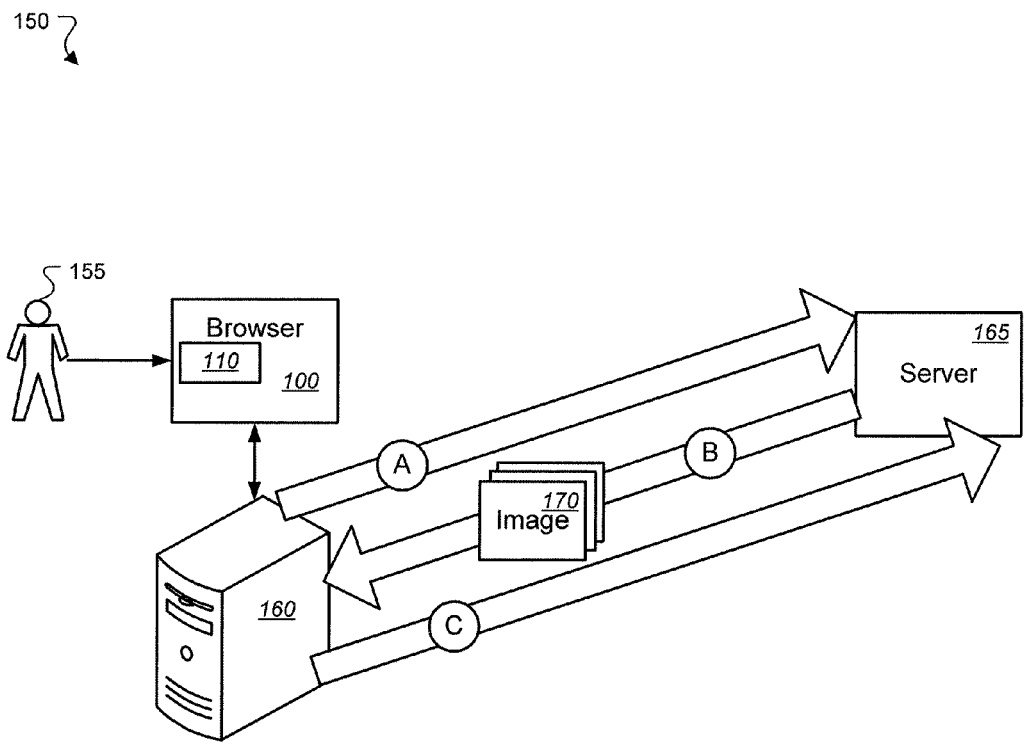

An example of a near real time image editing operation is shown in FIG. 1B. FIG. 1B shows an exemplary system 150 that uses the browser 100. The system 150 includes a user 155 and a computing device 160. As shown in FIG. 1B, the user 155 uses the browser 100 to edit the image 110. For example, the user 155 may select one or more image editing effects (e.g., color saturation, color desaturation, filtering, sharpening, etc.) to be applied to the image 110. The application of the effects to the image 110 may trigger the browser to send a message to a server 165 using the computing device 160, as shown as an arrow A. Responsive to the received message, the server 165 may generate one or more images by applying the selected effects to the image 110. The server 165 then transmits generated images 170 back to the computing device 165, as shown as an arrow B. Using the browser, the user 155 may locally blend the images 170 with the original image 110. When the user 155 completes the application of the effects (e.g., determined the degree of application of each of the effects), the browser 100 may transmit a message that includes, for example, a complete set of effects and parameters, to the server 165 to apply to the image 110.

In some implementations, the method can return a modified image to the browser after receipt of the final data (e.g., crop data, effect data etc.), the modified image having a uniform resource locator (URL) and being adjusted (e.g., cropped, or otherwise adjusted or filtered, etc.) in accordance with the data.

Figure 2:
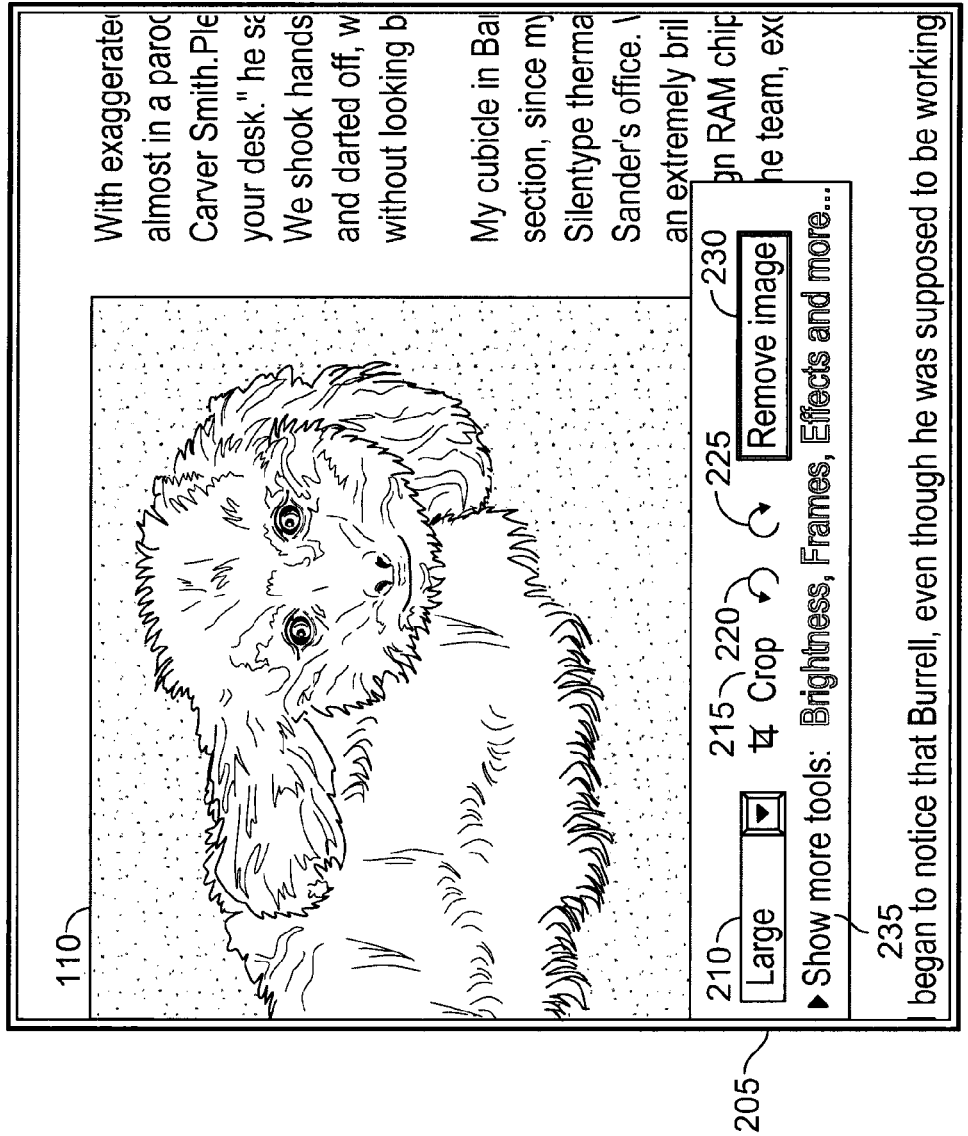
FIG. 2 shows an exemplary user interface presented by the page creating process when a user selects the image to be edited.

FIG. 2 shows an exemplary user interface 200 presented by the page creating process when a user selects the image 110 to be edited. In the example shown, the user selection may trigger the browser 100 to invoke a property bubble 205, which can be of the form of a small dialog box, to edit the selected image 105. As an example, the property bubble 205 may be invoked when the user moves a cursor over the image 110. As another example, the property bubble 205 may be invoked when the user double clicks on the image 110. As another example, the property bubble 205 may be invoked when the user presses a key on the keyboard and/or clicks on the image 110. Other invocation means are possible.

As shown in FIG. 2, the property bubble 205 includes a drop down menu 210 for image resizing, a crop button 215, a rotate left button 220, a rotate right button 225, a remove image button 230 and a show more tools button 235. The user may use the drop down menu 210 to adjust the size of the image 110. For example, the drop down menu 210 may allow the user to adjust the size of the image 110 to small, medium, large, or in an original size of the image. Alternatively, image re-sizing can be performed by providing controls at, for example, corners of the image presented in the browser that can be manipulated (e.g., dragged) to allow for the variable re-sizing of the image. In one implementation, the variable resizing can be constrained to maintain an aspect ratio (i.e., the ratio of the horizontal and vertical sizes) of the original image so as to minimize the introduction of distortion. In one implementation, the aspect ratio constraints can be overridden by a user.

The user may select one of the buttons 215, 220, 225, 230, 235 to edit the image 110. The user can select the crop button 215 to expand, shrink, and change the focus of the image 110. By focus, we refer to the definition of the particular portion of the image that is to be displayed in a given display area. Cropping allows the user to focus on a desired portion of the image for presentation in the display area. The crop operation in the page creating process is described in detail with reference to FIG. 3 and FIG. 4. The user can select the rotate left button 220 to rotate the image 110 to the left (e.g., rotating the image left for 90 degrees). The user can select the rotate right button 225 to rotate the image 110 to the right (e.g., rotating to the right for 90 degrees). The user can also remove the selected image 110 by selecting the remove image button 230. When the show more tools button 235 is selected, the property bubble 205 may display a list of other effects that may be applied to the image 110. Some of the effects are described in further detail with reference to FIGS. 5-12.

Figure 3:
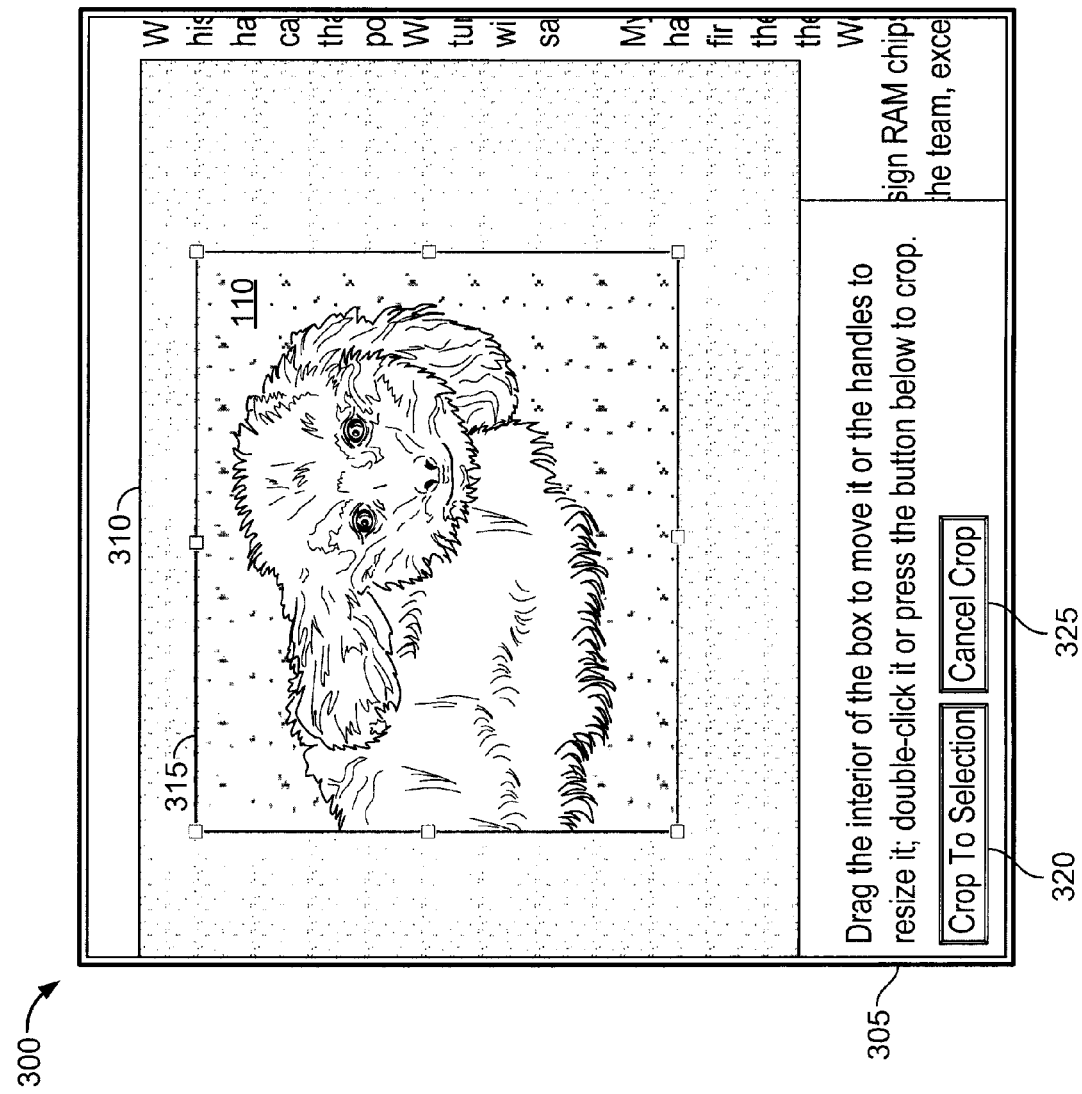
FIG. 3 shows an exemplary user interface that is presented for cropping the image.

FIG. 3 shows an exemplary user interface 300 that is presented for cropping the image 110. User interface 300 includes a property bubble 305 that may be invoked, for example, when a user selects the crop button 215 in the property bubble 205 (FIG. 2). In the example shown, the user interface 300 includes an image cropping region 310. In some implementations, the image cropping region 310 may be displayed without interaction with a server. The image cropping region 310 includes a crop box 315 that includes a portion of the selected image 110 and is of a default size and positioned at a default position (i.e., relative to an origin of the image 110). For example, the crop box 315 may first display a portion of the image 110 substantially equal to 50% of the original image and centered at the center of the image 110. In other examples, 30%, 70%, 100%, or other portion of the original image size may be displayed in the crop box 315. In another implementation, a default crop box may not be displayed when the user selects the crop button 215. The user can, using a handheld pointing device (e.g., a mouse), define an initial size of the crop box 315 in the cropping region 310, by for example, a click and drag operation (e.g., drag out a crop box with a mouse). The user may use the crop box 315 to crop the image. For example, the user can adjust a size of the final image to be displayed by adjusting a size of the crop box 315 and change the portion of the image displayed by moving or otherwise adjusting the crop box 315.

In some implementations, the page creating process may adjust the size and the position of the crop box 315 without communicating with the server. When the user is finished cropping the image 110, the user may indicate the cropping is complete (e.g., select a Crop-to-Selection button 320 in the property bubble 305 or double click the crop box). Responsive thereto, the page creating process (e.g., using the browser) may send crop data to the server. In one implementation the crop data includes parameter data defining the size and position of the crop box relative to an origin associated with the image 110. In some implementations, the server may store a copy of the image 110 and crop the image based on the crop data. In some implementations, responsive to the transmission of the crop data, the browser 100 may receive an image that has been cropped by the server and that has a uniform resource locator (URL). The received page may include the cropped image in accordance with the crop data.

In another example, the user may cancel the crop adjustment by selecting the cancel crop button 325. When the cancel crop button 325 is selected, the page creating process may discard all the cropping data that has been generated and associated with the image 110.

Figure 4:
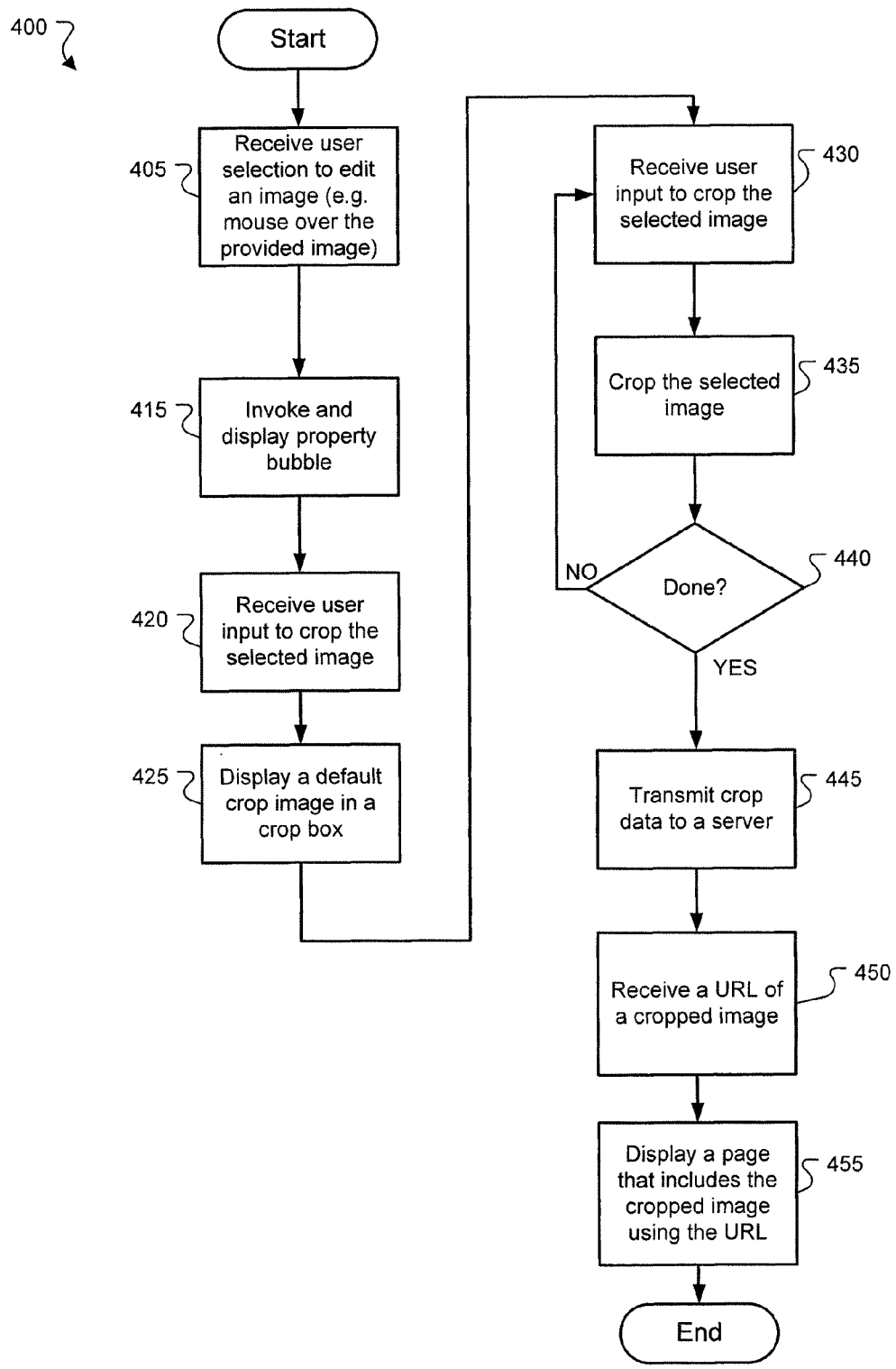
FIG. 4 shows a flow chart of exemplary method that the page creating process may perform to crop an image.

FIG. 4 shows a flow chart of an exemplary method 400 that the page creating process may perform to crop an image. Referring to FIGS. 1, 2 and 4, the method begins in step 405 when a browser (e.g., browser 100) receives a user selection to edit an image (e.g., image 110). As an example, the user may move a cursor over the image to select the image. As another example, the user may double click the image to select the image. Thereafter, the browser receives user input to edit the selected image. Responsive to the user input, the browser displays a property bubble (e.g., property bubble 205) to allow for the editing of the selected image in step 415. In some implementations, the browser is triggered to invoke the property bubble when the user selects the image. In other implementations, the user may select a control, such as a button, included in the browser to trigger the invocation of the property bubble.

After the property bubble is displayed, the browser may receive a user input to crop the selected image in step 420. For example, the user may select the crop button 215 in the property bubble 205 to begin cropping the selected image. In step 425, the browser displays a default crop image in a crop box. For example, the browser may display a default crop image that is substantially 50% of the selected image. The browser may, in step 430, receive one or more user inputs to adjust the crop of the selected image. For example, the user may move the crop box or change the size of the crop box to modify a portion of the selected image to be cropped. In step 435, the browser may locally crop the image including adjust a portion of the selected image according to the received user input. The browser may determine whether cropping of the selected image is complete in step 440. For example, the browser may check whether the Crop-to-Selection button 320 is selected.

If the browser determines that the user is not done with the cropping (e.g., receives more crop adjustment input from the user), then step 430 is repeated. When the browser determines that the user has completed the crop operation, the browser transmits crop data to a server in step 445. For example, the browser may transmit to the server image identification data (e.g., an image identification string, a location of the image in the server, etc.), a size (e.g. width and length) of a portion of the image to display, and an offset from a reference point relative to the original image. The transmission may be of the form of a URL that includes the image identification data and the crop data. Responsive to the transmission of the crop data to the server, the browser receives an image that is cropped in accordance with the crop data. Using the received image, the browser 100 may display an updated page that includes the cropped image and the method 400 ends. Alternatively, the browser send data to the server requesting the transformed image, and may receive in turn a URL that designates the transformed image. Thereafter, the URL may be presented as part of page request that returns the transformed image to the browser.

Figure 5:
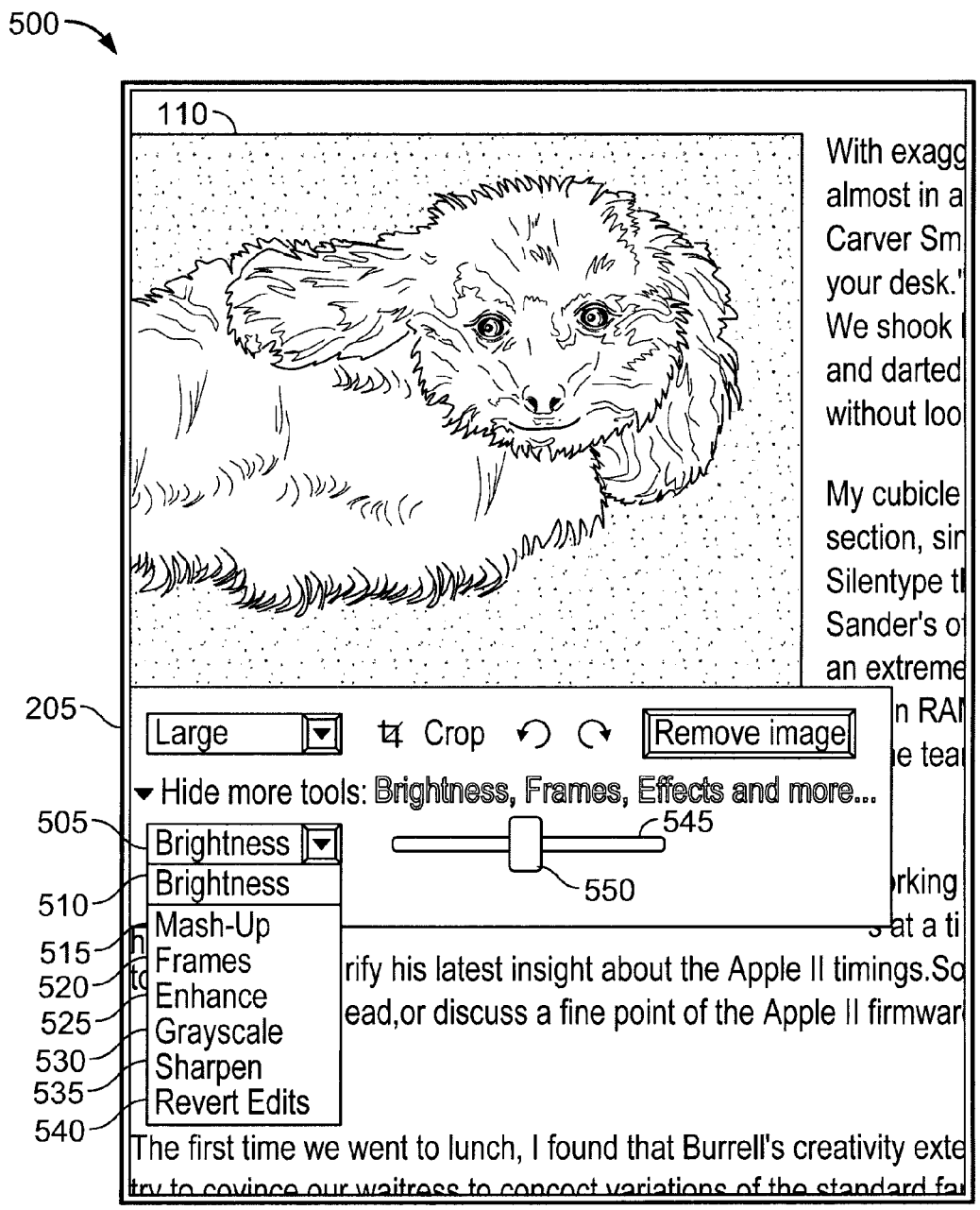
FIG. 5 shows an exemplary user interface that includes the image and the property bubble.

FIG. 5 shows an exemplary user interface 500 that includes the image 110 and the property bubble 205. A user may select the show more tools button 235 (shown in FIG. 2) to invoke the display of user interface 500.

As shown, the user interface 500 includes a pull down menu 505 that includes a number of effects that may be applied to the image 110. In the example shown, a user may apply a brightness effect 510, a mash-up effect 515, a frames effects 520, an enhance effect 525, a grayscale effect 530, a sharpen effect 535, and a revert edits effect 540 to the image 110. The user can adjust the brightness of the image 110 by selecting the brightness effect 510 from the menu 505. The user can merge the image 110 and another user-selected image by selecting the mash-up effect 515 from the menu 505. The user can add a frame to the image 110 (e.g., around the image 110) by selecting the frames effect 520 from the menu 505. The user can enhance the image 110 by selecting the enhance effect 525 from the menu 505. The user can mute the colors of the image 110 by selecting the grayscale effect 530 from the menu 505. The user can sharpen the image 110 by selecting the sharpen effect 535 from the menu 505. Exemplary methods for performing the brightness effect 510 and the grayscale effect 525 are described in details with reference to FIG. 9 and FIG. 14.

In the example shown, the property bubble 205 further includes a slide bar 545. The slide bar includes a slider 550. For some image effects, the page creating process may use the slider 550 to determine an extent of a selected effect to be applied to the image 110. Other controls are possible for receiving user input to define the extent of the effect applied including other forms of selectors or input elements. In some implementations, the property bubble 205 includes arrow keys to control a property of the image, such as brightness, contrast, and/or other image properties. For example, if the user selects to apply the brightness effect 510 to the image 110, the user can manipulate the slider 550 associated with the slide bar 545 to set how bright the image 110 should be.

In some implementations, for some effect applications, the page creating process may blend the image 110 with one or more images. For example, the page creating process may blend the image 110 with a substantially white image when the user selects to brighten the image 110. In some implementations, the control (e.g., the position of the slider 550 on the slide bar 545) may determine the opacity of the second image (hereinafter referred to as the blended image) that is blended with the image 110. For example, when the browser 100 is applying brightness to the image 110, sliding the slider 550 to the right end of the slide bar 545 may instruct the browser 100 to blend the image 110 with the white image with a substantially 100% opacity, resulting in the display of a substantially white image in the browser.

Blending of images by the browser can be accomplished by numerous means. For example, blending can be achieved using absolute positioning definitions and Z-layer tags. Opacity parameters can be associated with one or more images associated with the blend. Other means are possible, including using style sheets (e.g., CSS style sheets), ActiveX controls, or other techniques to realize the blend of the two images.

In some implementations, the page creating process may include a script that may identify the second image. The page creating process may blend the second image with the selected image to apply the selected effect to the selected image as described above. In some examples, the second image is generated locally using the script. In other examples, the second image is generated by searching a local memory device. In other examples, the page creating process may prompt the user to select the second image. In other examples, the browser 100 may send a request to the server to retrieve an appropriate image.

Figure 6:
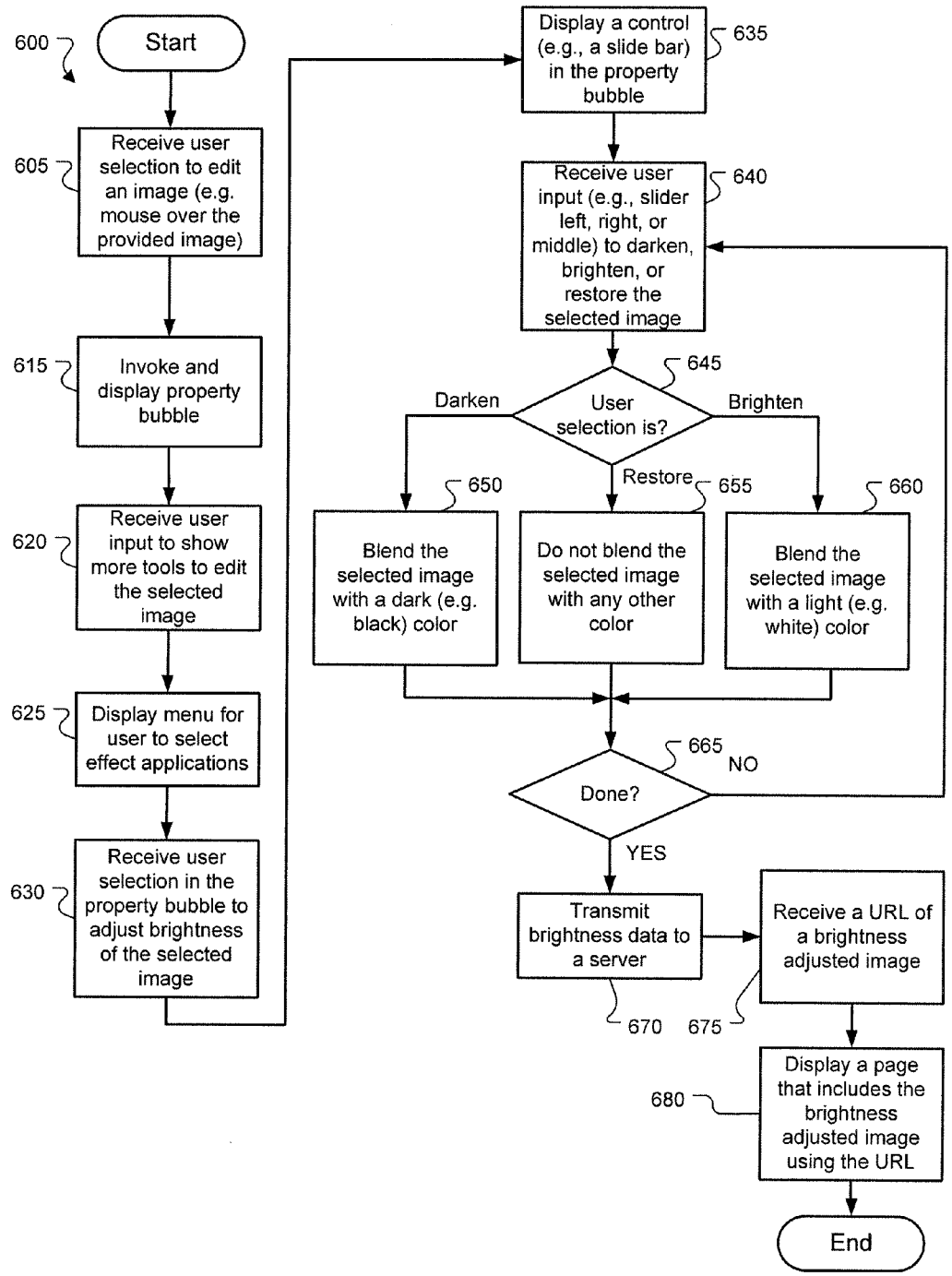
FIG. 6 shows a flow chart of exemplary method that the page creating process may perform to adjust brightness of an image.

FIG. 6 shows a flow chart of exemplary method 600 that the page creating process may perform to adjust brightness of an image. Referring to FIGS. 1, 2 and 6, the method 600 begins in step 605 when a browser (e.g., the browser 100) receives a user selection to edit an image (e.g., the image 110). Responsive to the user input, the browser displays an editor (e.g., property bubble 205) to allow for the editing of the selected image in step in step 615. After the property bubble is displayed, the browser may, in step 620, receive a user input to show more tools to edit the selected image. For example, the browser may receive a selection on the show more tools button 235.

In step 625, the browser may display a menu, such as the drop down menu 505 for the user to select effect applications. In this example, the user selects to adjust brightness of the selected image in step 630. Next, the browser displays, in step 640, a control, such as the slide bar 545, in the property bubble 205. In one implementation, the browser can receive user input to darken, brighten, or restore the brightness of the selected image. In some implementations, the user may use the slide bar 545 to darken, brighten, or restore the brightness of the selected image. For example, the user may slide the slider 550 to the left or right to indicate to darken or brighten the image, respectively. The user may also slide the slider 550 to the middle of the slide bar 545 to restore the original brightness of the selected image.

Next, in step 645, the browser determines, based on user input, whether the user's selection is to brighten, darken, or restore the brightness of the selected image. If the browser determines that the user selects to darken the selected image, then the browser may blend the selected image with a dark (e.g., substantially black) color in step 650. In one implementation, the blending of the image with a color can be achieved by blending the selected image for a second image having the desired color. The blend can be controlled based on the opacity associated with the dark color image. In one implementation, the user input includes information for determining a desired opacity of the dark color (e.g., by sliding the slider 550 half way toward the end relative to the middle, a substantially 50% opacity is desired). Linear or non-linear adjustments can be associated with a respective control. For example, with a slider, the adjustments made near the midpoint of the slide bar 545 can be less dramatic than those made at the extremes of the slide bar. In one implementation, the browser may determine that the opacity of the dark color is higher when the slider 550 is further to the left relative to a start point.

In step 645, if the browser determines that the user selects to restore the brightness of the selected image, then the browser may, in step 655, set the opacity of any color that is to be combined with the selected image to substantially zero. If, in step 655, the browser determines that the user selects to brighten the selected image, then the browser may blend the selected image with a light (e.g., white) color in step 660. After the steps 650, 655, or 660, the browser determines, in step 665, whether the user has finished adjusting the brightness of the selected image. If the browser determines, in step 665, that the user has not finished adjusting the brightness of the selected image, then, step 640 is repeated.

In another implementation, the darkening or brightening operation may be performed by blending a dark image or a white image with the selected image, respectively. The user input may control the opacity associated with the dark or the white image.

If the browser determines that the user has finished adjusting the brightness of the selected image in step 665, then the browser transmits brightness data to a server in step 670 (e.g., in the form of a URL). For example, the browser may transmit brightness data that includes an image identification (e.g., an image identification string, a location of the image in the server, etc.), and the new brightness level of the selected image to the server (e.g., in absolute terms or relative to a last brightness level setting). Then, in step 675, the browser receives an image with brightness adjusted in accordance with the brightness data. The browser may display, in step 680, an updated page that includes the brightness adjusted image and the method 600 ends.

Figure 7:
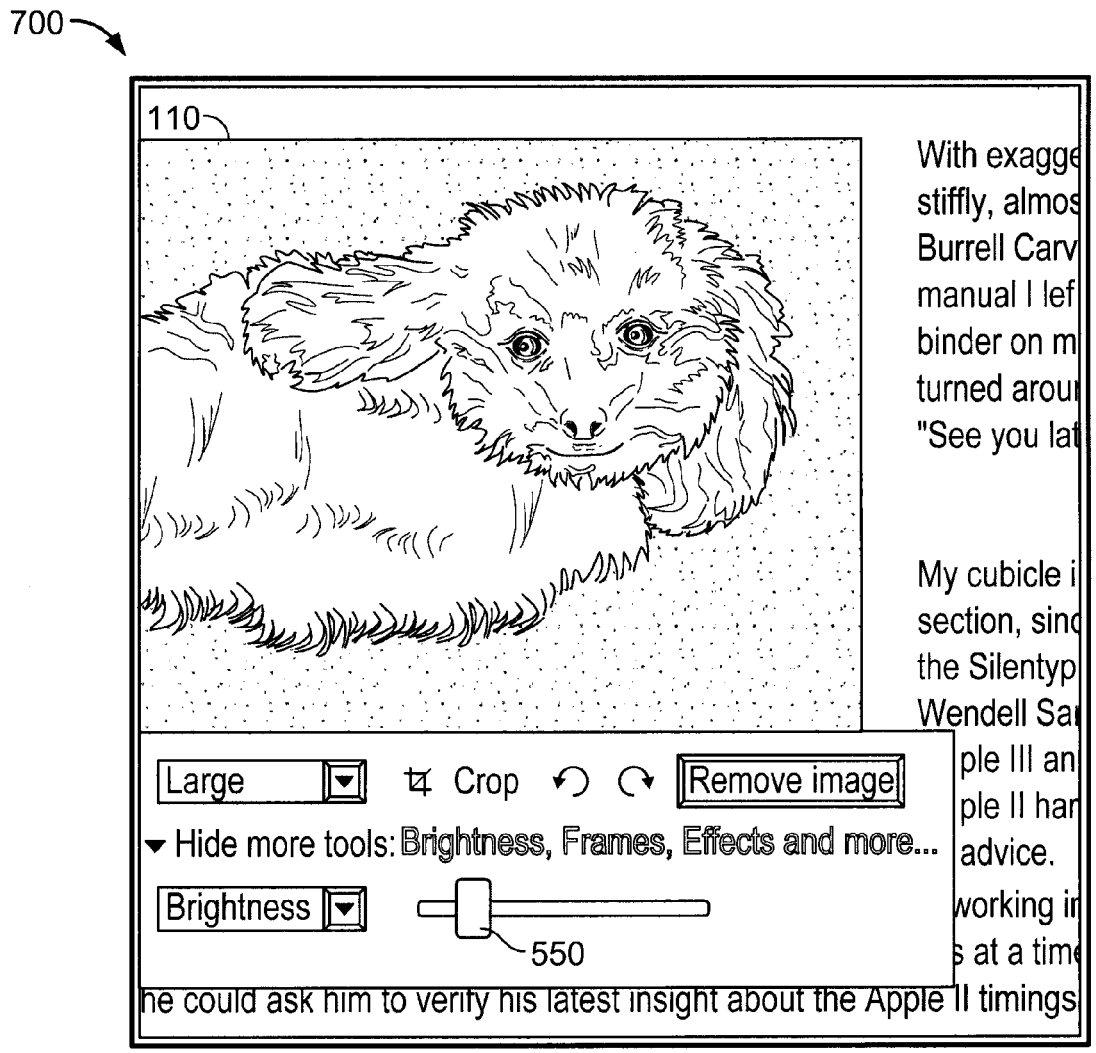
FIG. 7 shows an exemplary user interface that shows a result of a brightness adjustment operation.

FIG. 7 shows an exemplary user interface 700 that shows a result of a brightness adjustment operation. As shown, the control (e.g., slider 550) has been adjusted (e.g., has been moved substantially to the left), resulting in a substantially darkened version of the image 110.

Figure 8:
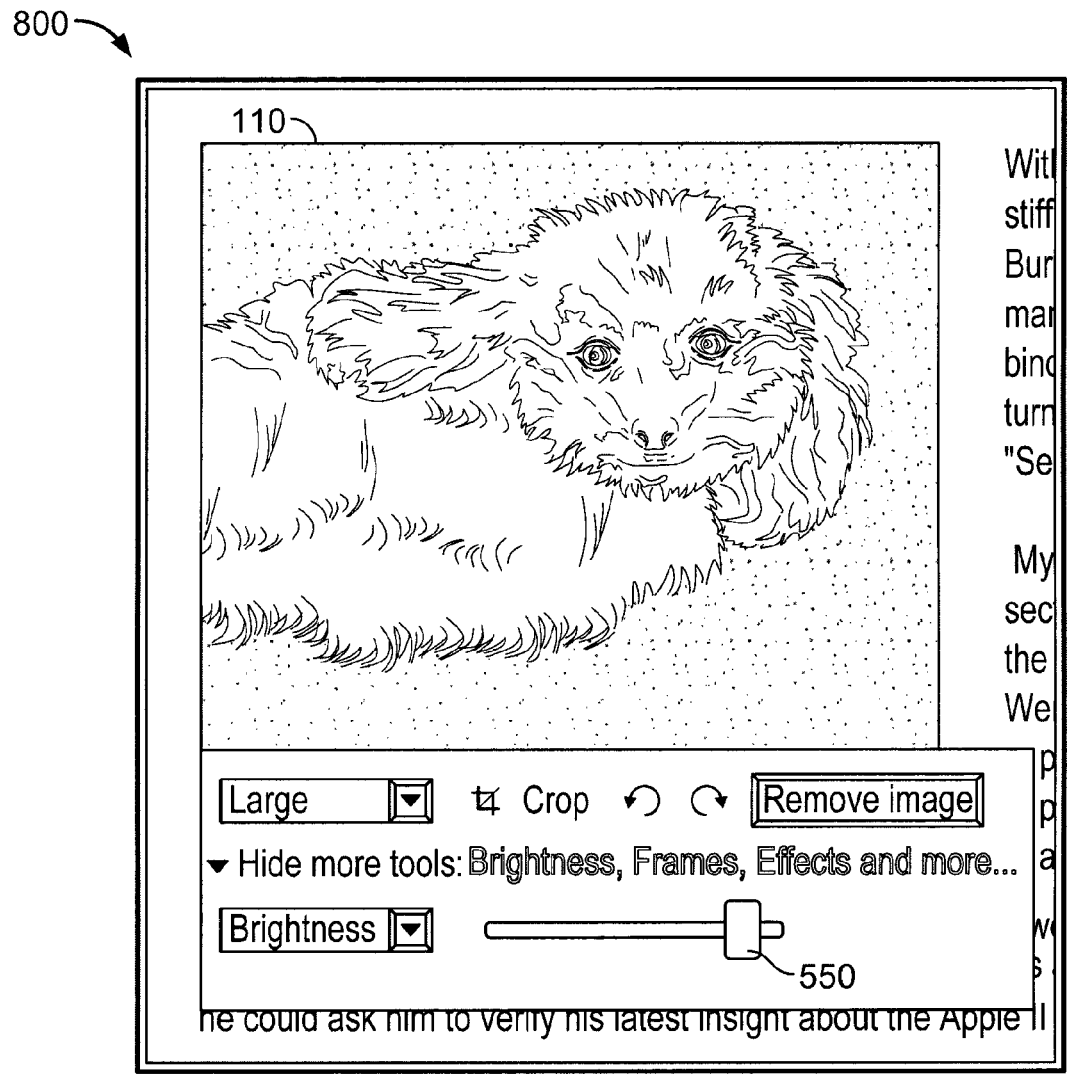
FIG. 8 shows an exemplary user interface that shows a result of a brightness adjustment operation.

FIG. 8 shows an exemplary user interface 800 that shows a result of an alternative brightness adjustment operation. As shown, the control (e.g., slider 550) has been adjusted (e.g., has been moved substantially to the right), resulting in a substantially brightened version of the image 110.

In some implementations, a user may also use the page creating process to apply a variable amount of tint to an image. Similar to the method 600 (FIG. 6), the browser 100 may combine a tint color with an image when a user selects to tint the image. The browser 100 may determine the level of tint to be applied to the image based on a position of the slider 550.

Figure 9:
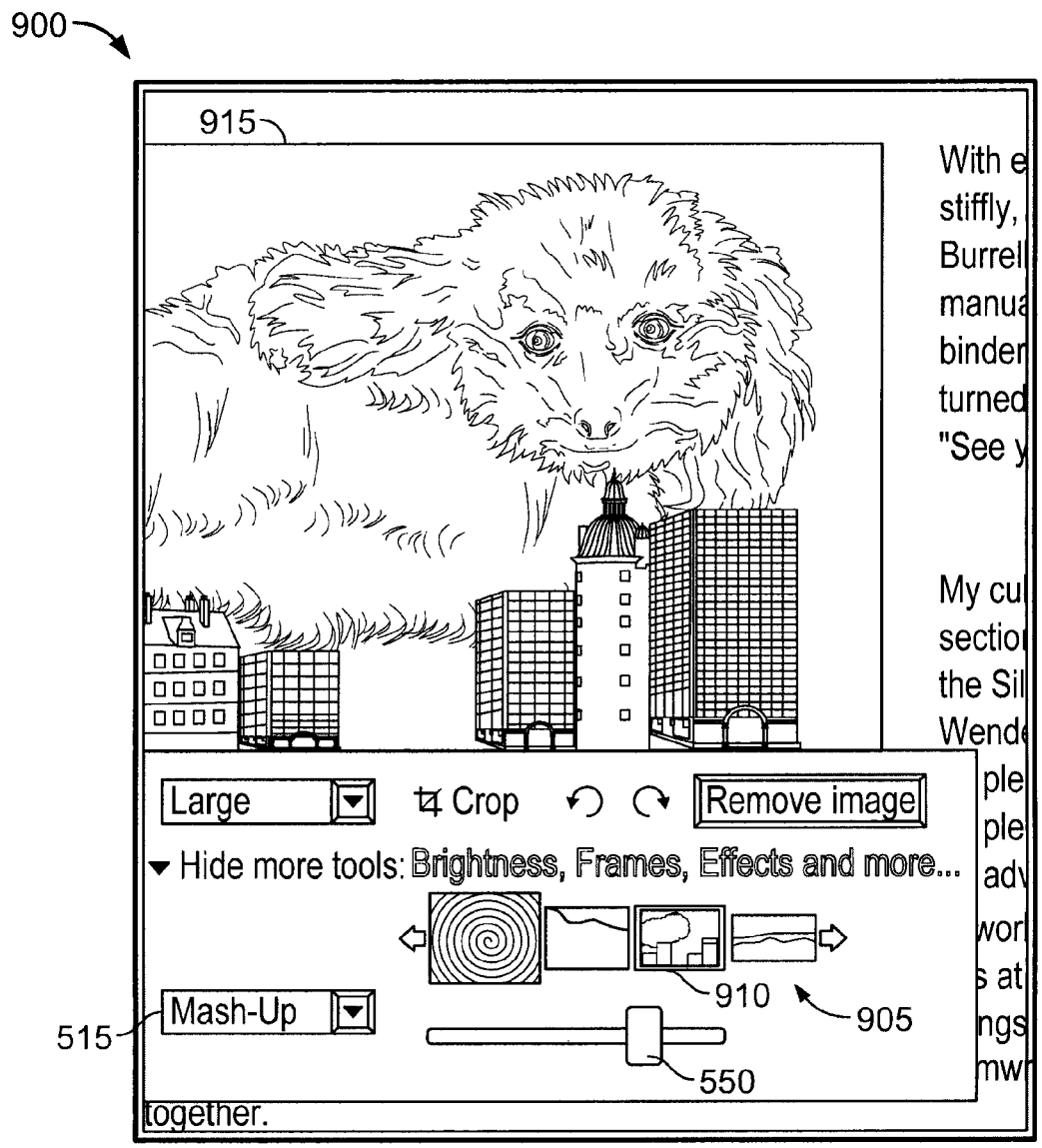
FIG. 9 shows an exemplary user interface after a mash-up effect is applied to the image.

FIG. 9 shows an exemplary user interface 900 associated with the mash-up effect 515 as could be applied to the image 110. The browser 100 performs the mash-up effect 515 by blending the image 110 with another user-selected image. User interface 900 can be displayed when the mash-up effect is selected from the menu presented on the property bubble described above. In the example shown, the user interface 900 includes an image selection menu 905. The image selection menu 905 includes a plurality of images that is available to the browser 100 for user-selection. Other selection tools are possible. In some implementations, the browser 100 may retrieve the images from predefined locations in the local memory. In other implementations, the browser 100 may retrieve the images from a predefined URL in the Internet. In other implementations, the browser 100 may prompt the user to provide a name, a path, a location, a web address or other identifier to retrieve the images.

In order to invoke the mash-up effect, the user selects an image (the second image) for the blend (e.g., image 910). Once selected, the browser 100 may blend the image 110 and the second image (e.g., the image 910). In some implementations, blending of the image can be controlled by the user. For example, the opacity level for the second image can be set by the user using a control (e.g., a slider 550 associated with a slide bar 545). In the example shown, the user can define the opacity of the image 910 depending on the position of the slider 550. In this example, the image 910 may have an opacity of substantially zero when the slider 550 is at the left most position and the image 910 may be substantially opaque when the slider 550 is at the right most position. Other configurations are possible. The control can include a linear or non-linear translation of input data (e.g., slider position) to opacity values. As shown, the current position of the slider 550 may result in an image 915 (i.e., a particular blend of the image 110 and the image 910).

Figure 10:
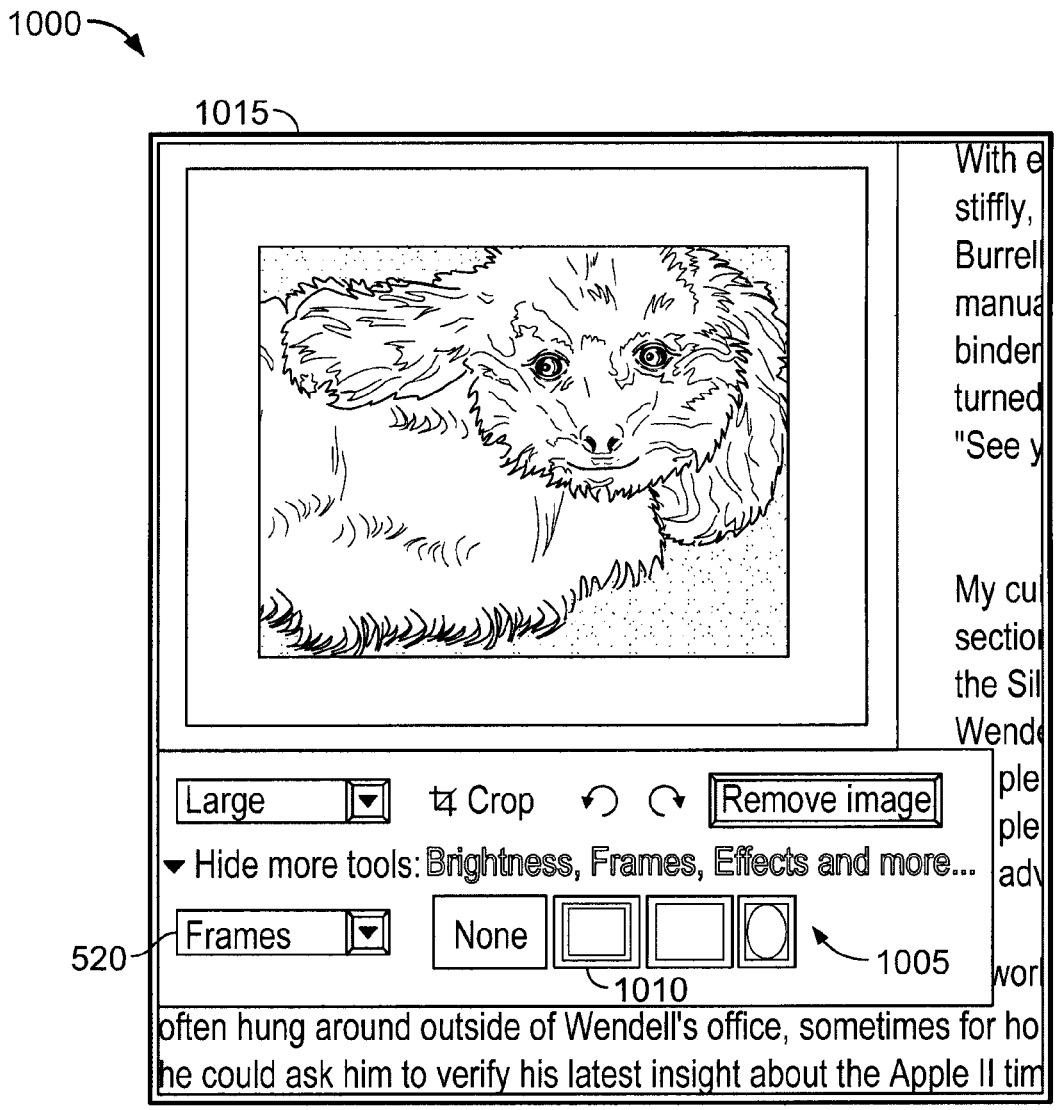
FIG. 10 shows an exemplary user interface after the frames effect is applied to the image.

FIG. 10 shows an exemplary user interface 1000 associated with the frames effect 520 when applied to the image 110. The user interface 1000 can be produced when the frames effect is selected by the user from the menu in the property bubble described above. The browser 100 can produce the frames effect 520 by blending the image 110 with a user-selected frame image. In the example shown, the user interface 1000 includes a frame selection menu 1005. The frame selection menu 1005 includes one or more frame images that are available to the browser 100 for user-selection. In some implementations, the browser 100 may retrieve the frame images from one or more predefined locations in the local memory. In other implementations, the browser 100 may retrieve the frame images from the server.

As shown, the user selects the frame image 1010. The browser 100 may blend the image 110 and the frame image 1010, producing for example the result 1015. In this example, the browser may set that a periphery region of frame image 1010 to be substantially opaque and another region (e.g., an interior region) of the frame image is substantially transparent. In other implementations, the browser 100 may apply other effects to the other region of the frame image. For example, the browser 100 may set the interior region of the frame image to be slightly opaque (e.g., with 5% or 10% opacity). In some examples, the small opacity of the image may give a look and feel of the resultant image being behind glass.

Figure 11:
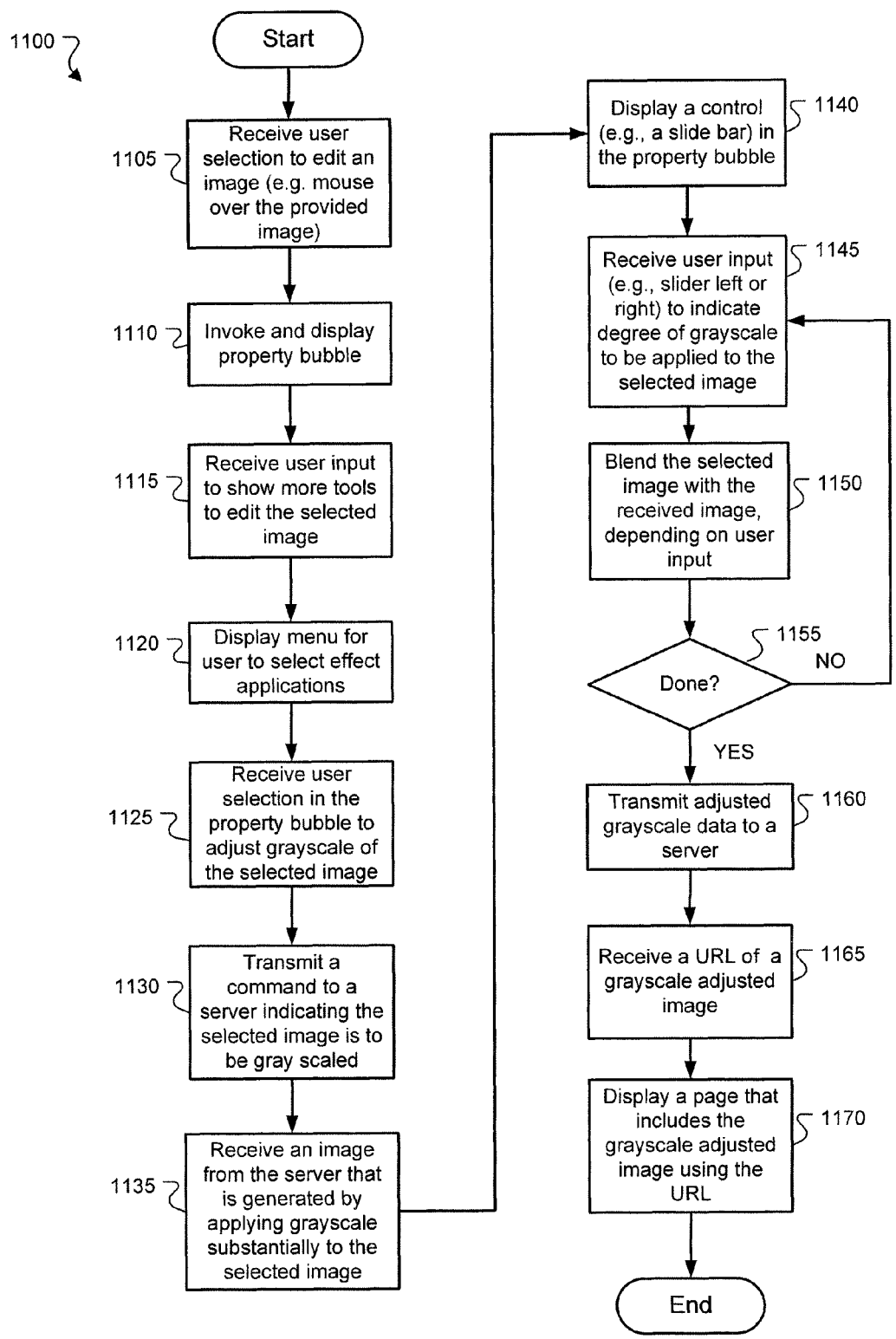
FIG. 11 shows a flow chart of exemplary method that the page creating process may perform to execute a grayscale operation on an image.

FIG. 11 shows a flow chart of an exemplary method 1100 that the page creating process may perform to desaturate an image. Referring to FIGS. 1, 2 and 11, the method 1100 begins in step 1105 when a browser (e.g., browser 100) receives a user selection to edit an image (e.g., image 110). Responsive to the user input, the browser displays a property bubble (e.g., property bubble 205) to allow for the editing of the selected image in step 1105. In some implementations, the browser is triggered to invoke the property bubble when the user selects the image. In other implementations, the user may select a control, such as a button, included in the browser to trigger the invocation of the property bubble. After the property bubble is displayed, the browser may, in step 1115, receive a user input to show more tools to edit the selected image. For example, the browser may receive a selection on the show more tools button 235.

In step 1120, the browser may display a menu, such as the drop down menu 505 (FIG. 5) for the user to select effect applications. In this example, the user selects to adjust a degree of color saturation of the selected image in step 1125. The browser then, in step 1130, transmits a command to a server indicating that the selected image is to be desaturated. For example, the browser may transmit an identification number of the selected image and a grayscale command to the server. In step 1135, the browser receives from the server an image that is generated by applying grayscale substantially to the selected image.

Thereafter, the browser displays a control (e.g., a slide bar) in the property bubble in step 1140. The browser may, in step 1145, receive user input, such as slider left or slider right, to indicate a degree of desaturation to be applied to the selected image. In step 1150, the browser blends the selected image and the received image depending on the received user input. The blending of the selected image and the received image can be controlled by the user defining an opacity level for the received input. For example, input that the slider is on the left most position may indicate that no grayscale is to be applied to the image, which means the received image is substantially transparent and the opacity associated therewith is set to substantially 0%. Input that the slider is on the right most position may indicate that grayscale is fully applied to the image. In one implementation, input indicating full application of grayscale results in a setting of an opacity associated with the received image from the server at substantially 100%.

After the step 1150, the browser determines, in step 1155 whether the user is finished adjusting grayscale of the selected image. If the browser determines, in step 1155, that the user is not finished adjusting grayscale of the selected image, then the step 1145 is repeated. If the browser determines, in step 1155, that the user is finished adjusting the grayscale of the selected image, then the browser transmits grayscale data to the server in step 1160. For example, the grayscale data transmitted by the browser may include an image identification (e.g., an image identification string, a location of the image in the server, etc.), and the new grayscale level of the selected image to the server and be of the form of a URL. Then, in step 1165, the browser receives an image with grayscale adjusted in accordance with the grayscale data. The browser may display, in step 1170, an updated page that includes the grayscale adjusted image and the method 1100 ends.

Although only one example effect (i.e., grayscale) is described in FIG. 11, the browser may also perform methods similar to the method 1100 to apply other effects to the selected image. For example, the browser may enhance (e.g., perform saturation, Gaussian blur, filter, equalize, etc.) the selected image by similar methods and means. In one example, the browser may transmit an enhance command and the identification of the selected image to the server and receive an enhanced image from the server. The browser may blend the selected image and the received enhanced image, depending on user input, such as the position of the slider 550 (FIG. 5) or other control data. In another example, a user may select the enhance effect 525 to automatically optimizing brightness and contrast of an image. In another example, the user can select a "lucky" (as in "are you feeling lucky?") effect that can result in the application of a system designated combination of one or more effects to the image.

As another example, the browser may sharpen the selected image. The browser may transmit a sharpen command and the identification of the selected image to the server and receive a substantially sharpened version of the selected image from the server. The browser may determine a sharpening level from a user input, such as the position of the slider 550 (FIG. 5), and blend the selected image and the received sharpened image. In one implementation, the browser may apply a transformation to an image and then present a slider to allow for adjustment by the user. One or more transformations may have default application levels (e.g., initially apply 100% of sharpening filter, apply 50% of the "lucky" filter, etc.) that are presented when the user selects the desired transformations. Adjustments from the default application level can be performed by the user, for example, using a slider or other input device.

In some implementations, the page creating process may allow the user to blend more than one image to the selected image. In one implementation, the page creating process may provide a mash-up effect that allows the user to mash-up two images to the selected image. For example, the property bubble may include a two dimensional control that allows the user to select the level of opacity of each of the two images. In another implementation, the page creating process may allow the user to simultaneously add a frame and mash up another image to the selected image. In another implementation, the property bubble may include multiple (e.g., three, five, or ten) sliding bars. A user can use the sliding bars to control applications of multiple effects to the selected image. In one implementation when multiple sliders are presented at a time, only a single slider is active. That is, only one of the plurality of sliders can be active and responsive to user input to adjust an image at a given time (i.e., to apply a measure of a transformation).

In another implementation, the user may combine transformations to achieve desirable results. For example, the user may combine two different transformations (e.g., a mask and blend) to provide a particular result. In one implementation the user can designate a transformation that defines a mask to effectively cut-out a portion of the image (e.g., define a mask to for example separate the foreground from the background of an image). After application of the mask, a blend operation can be selected to blend the masked image with a second image (e.g., blend the cut-out foreground image with a more desirable background image). Other combinations of transformations can be defined by the user or system. For example the system may automatically perform a masking operation based on limited user input.

Other transformations are possible. In one implementation, a mosaic transformation can be applied to an image. That is, an image can be tiled, representative images from a corpus can be used to replace individual tiles and the mosaic of the image can be presented to the user in the browser. Other image mesh operations are possible.

As another example, the browser may reverse edit the selected image. Reverse edit (e.g., undo or rollback) includes the reversing of a transformation that has been applied to a selected image. In one implementation, each image (i.e., including the original image and all transformed versions of the original image) requested by the browser is assigned a unique URL. Each separate transformation to be applied to the original image is represented by a unique portion of a given URL. When a user selects reverse effect from the menu in the property bubble, the user can be presented with a list of effects that have been applied. The list can be maintained by the browser at each submission to the server (e.g., at each time delta data such as grayscale data, crop data, etc. is submitted to the server). Alternatively, the list can be maintained using the URL data provided to the server responsive to submissions from the browser. The list can also be maintained in the URL of the image. Each effect (e.g., URL in the list or transformation information in the URL) can be individually selected, and rolled back. That is, upon selection of the desired effect to rollback from the menu, the browser can transmit a URL that will effectuate the rollback of the desired transformation to the server. Alternatively, the browser can transmit a rollback command and identify the transformation that is to be rolled back. In response, the server can operate on the selected image and return an image with the selected effect(s) removed in accordance with the rollback operation.

Figure 12A:
FIG. 12A shows an image in a browser that is to be edited.
Figure 12B:
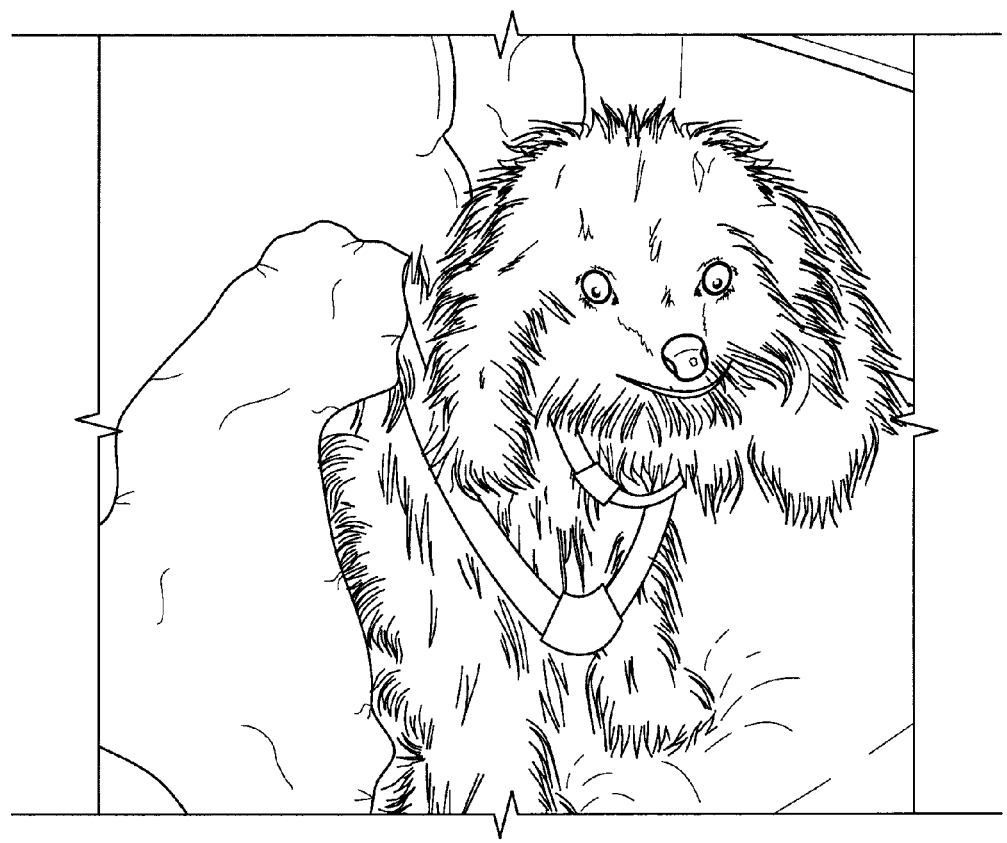
FIG. 12B shows the image of FIG. 12A after a cropping transformation.

In one implementation, images delivered to the browser are identified by a unique URL as described above. In one implementation, the URL can be formed by appending to an image identifier a series of transformation codes. Each transformation code can define a particular transformation that is to be/has been applied to an image. For example, an image as shown in FIG. 12A can be delivered to the browser in response to a selection or other user prompt. The initial image can represent a selected image prior to transformation (e.g., manipulation or application of effects using the methods described above). The URL associated with the starting or static image can be of the form of server.imageid (e.g., http://googlepages.com/daisy_dress.jpg). FIG. 12B, shows an image that has been transformed, for example to apply a cropping transformation. The cropping transformation can be the result of editing in the browser and applying the desired effect. The URL associated with the edited image can be of the form of server.imageid.transform1data (e.g., http://googlepages.com/daisy_dress-crop:0.5, 0.6, 0.74, 0.99.jpg). Transform1data can include both an identifier for an effect/manipulation to be applied, as well as additional data that is required to apply the desired transformation (e.g., here the crop operation). For example, parameter data may be included to indicate how to apply the desired transformation (e.g., data defining where to remove red-eye from an image; data defining a blend image and opacity data for the blend; mash data; crop data; etc.).

Figure 12C:
FIG. 12C shows the image of FIG. 12B after a gray-scale transformation.
Figure 12D:
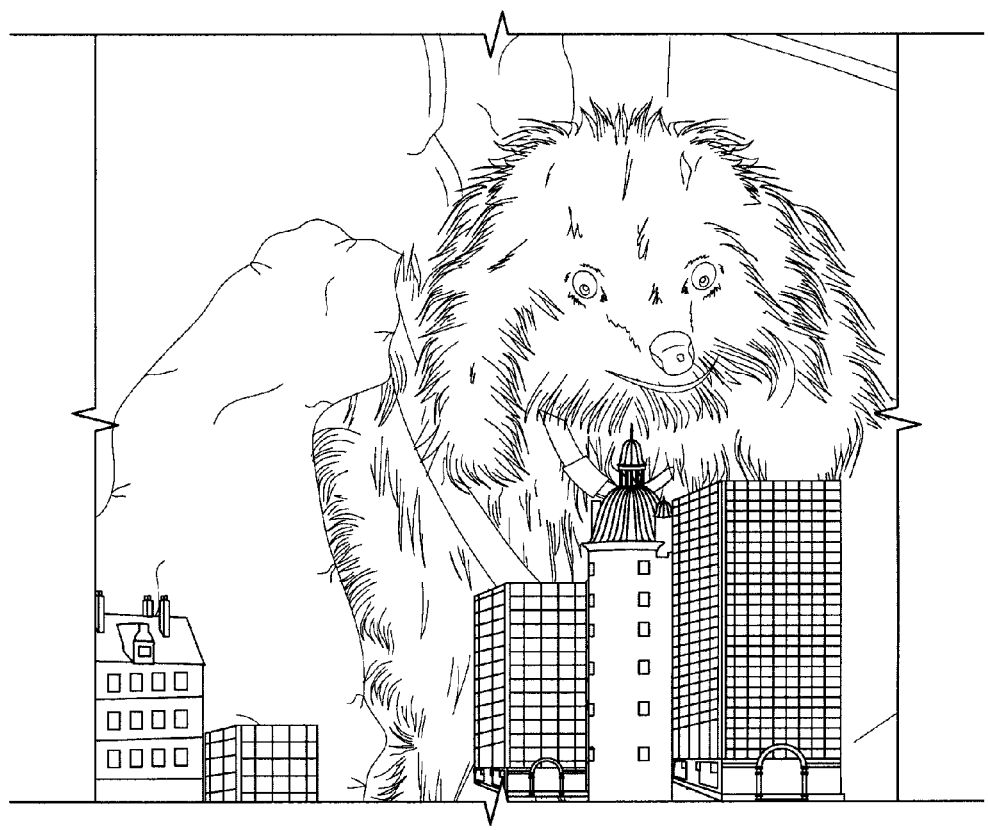
FIG. 12D shows the image of FIG. 12C after a blend transformation.

FIG. 12C, shows an image that has been manipulated, for example to apply a second transformation (a gray-scale effect), in addition to the first transformation. The transformation can be the result of editing in the browser and applying the desired transformation. The URL associated with the edited image can be of the form of server.imageid.transform1data.transform2data (e.g., http://googlepages.com/daisy_dress:crop 0.5, 0.6, 0.74, 0.99; effect:grayscale, 50.jpg). Transform2data can include both an identifier for an transformation to be applied, as well as additional data that is required to apply the desired transformation (i.e., similar to transform1 data described above, but here the transformation data includes a level of grayscale to apply). For example, parameter data may be included to indicate how to apply the desired second transformation (e.g., data defining where to remove red-eye from an image; data defining a blend image and opacity data for the blend; mash data; crop data; grayscale data; etc.). Similarly, a plurality of additional transformations can be applied to the image as is shown in association with FIG. 12D. FIG. 12D includes the addition of a blend operation to the previously cropped and grayscaled image shown in FIG. 12C and having an associated unique URL (e.g., http://googlepages.com/daisy_dress:crop 0.5, 0.6, 0.74, 0.99;effect:grayscale,50; blend:rainbow, 75.jpg). Each transformation can result in the generation of a unique URL that includes server data, an image identifier, and a list of appended data that define individual transformations (e.g., effects or manipulations that have been applied using the browser edit tools and methods described above).

Figure 12E:
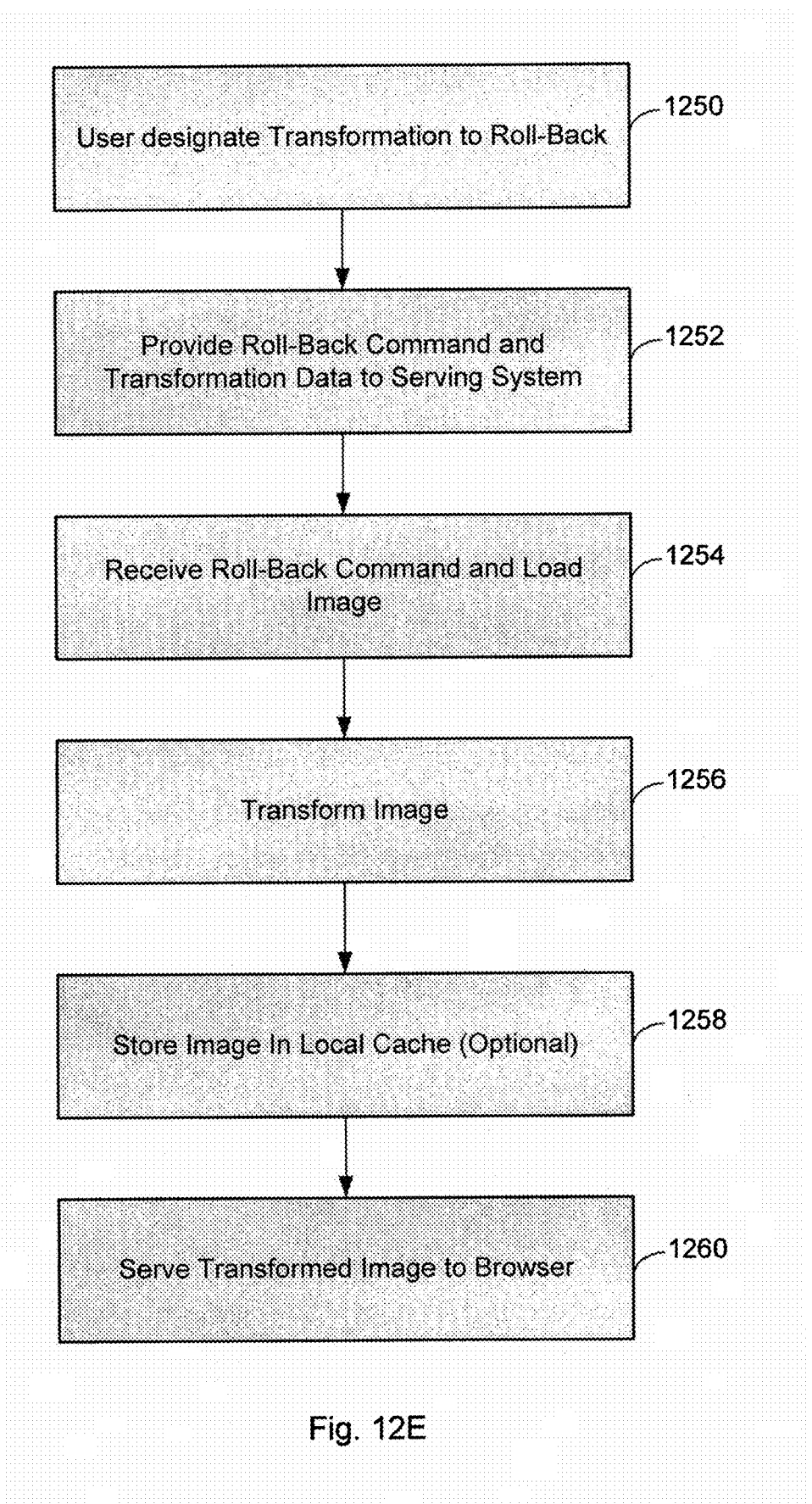
FIG. 12E shows a flow chart of an exemplary method for rolling back a transformation in a non-sequential order.

Referring now to FIG. 12E, a method for rolling back a transformation includes the following steps. A user designates one or more transformations to rollback (1250). The designation can be invoked by selection of a tool or menu in the browser interface to invoke a rollback. Alternatively, a hot key or sequence of user input can be received to invoke rollback. Selection can include selecting from a pull or drop down list or menu of transformations associated with the image being displayed in the browser. The pull or drop down list can include an identifier that is associated with each transformation. For example, a pull down list can include a sequential list of the transformations that have been applied to the image in a given session.

Alternatively, the pull or drop down list can include a list of the available transformations that can be rolled back that have been applied to the image. In some implementations, not all transformations can be rolled back. For example, the user or system may designate certain combinations of transformations as keyframes, and allow the user to rollback only to a prior keyframe. The transformations that aggregate to form a keyframe, may in this example, only be rolled back as a group. The aggregation of transformations can be performed by the system or by the user. For example, a user may have edited an image in the browser to perform a series of crop operations. An aggregate crop transformation that is the resultant of the plural crop operations (that reflects the combination of the series) can be made available for rollback as opposed to each individual crop operation in the sequence. Other coalesce operations can be used to combine transformations such that individual operations are not themselves able to be rolled back.

While a pull or drop down list or menu are described above, the selection or designation of the particular transformations to rollback can be performed by other conventional means. Advantageously, the user can select particular transformations without requiring that all transformations in a sequence be selected for rollback. For example, the user can have applied four transformations to the image and select only that the second transformation be rolled back without affecting the application of the other three transformations.

After selection of the transformations to rollback is complete, a rollback request including attending transformation data is provided to a serving system (1252). In one implementation, the rollback request is of the form of a unique URL that specifies the image and the transformations required. The transformation data can be of the form of an identifier for identifying an image and include transformation codes and attending data. In one implementation, the transformation codes and attending data can define the list of transformations that are to be applied to the identified image (e.g., leaving out the rollback transformation). Alternatively, the transformation data can include only the transformation that is to be rolled back. In this implementation, the state of the current image can be provided either from the browser or otherwise retrieved based on the last image that was served by the system (e.g., retrieved from a cache in the serving system).

The serving system can be a server that is providing the images to the browser. In some implementations, the server system also can perform the image transformations. Alternatively, a separate system can perform the image transformations. In the example provided herein, the serving system provides image data (including transformed images) to the browser, executes image transformations and rollback operations. In this example, the serving system receives the rollback request and the transformation data (e.g., the URL) and loads an image (1254). The loaded image is transformed in accordance with the transformation data (1256). In this example, the designated transformations can be applied (while not applying any rollback transformation(s)) to the image. The transformed image can optionally be stored in a local cache (1258), then served to the browser (1260).

In the backend (e.g., at the server), the serving of images can include the following. An image that is identified in a request from a browser (e.g., an image that is requested to be served with one or more transformations applied) can be retrieved. The backend can apply the designated transformations using parameter data that is provided along with the page request. The transformation operation can include the removal (i.e., not applying) a designated transformation from the list of previously applied transformations. Transformed images can be cached as required to improve system performance.

Figure 13:
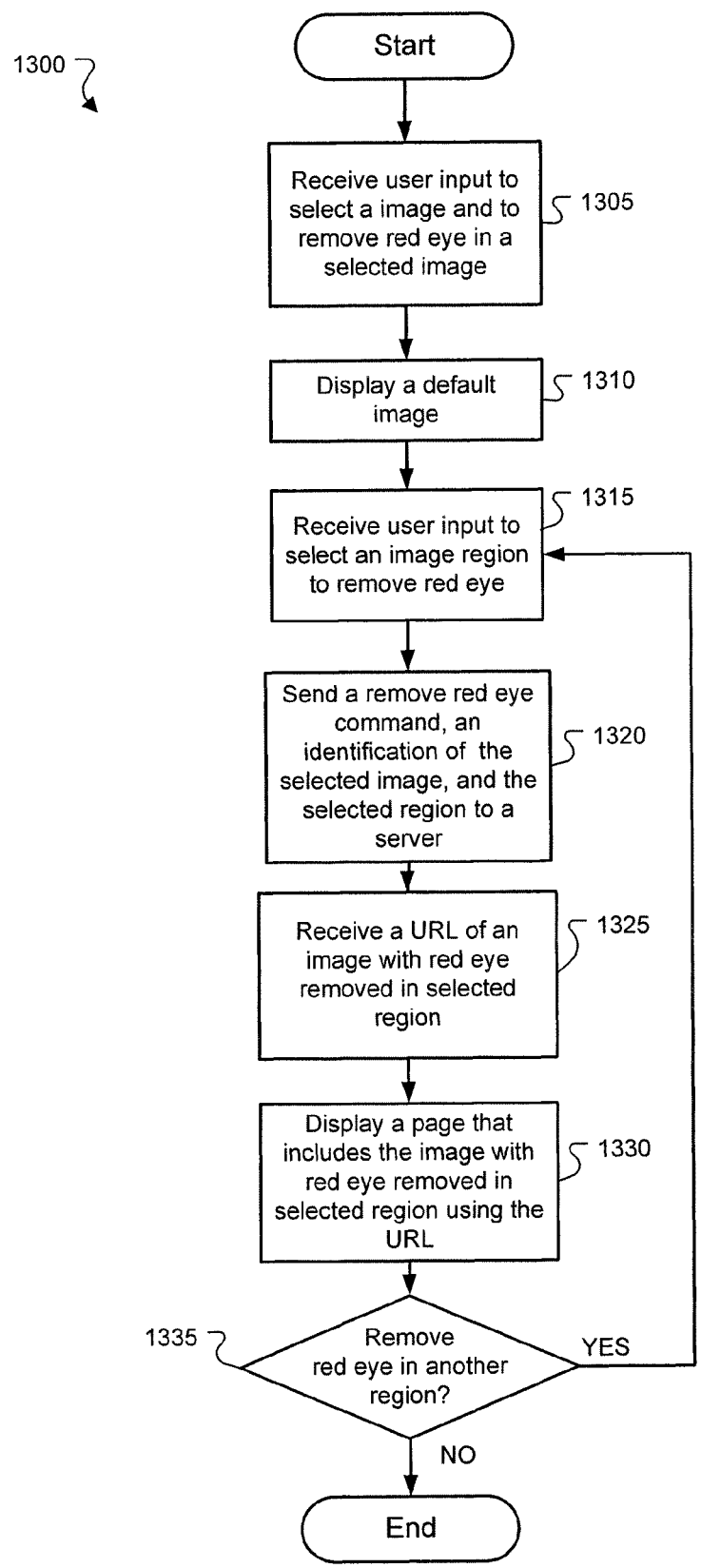
FIG. 13 shows a flow chart of exemplary method that the page creating process may perform to remove red eye from an image.

FIG. 13 shows a flow chart of exemplary method 1300 that the page creating process may perform to remove red eye from an image. Referring to FIGS. 1 and 13, the method 1300 begins in step 1305 when a browser (e.g., browser 100) receives a user selection to remove red eye from a selected image (e.g., image 110). The browser displays a default image in step 1310. In step 1315, the browser receives user input to select an image region to remove red eye. For example, the browser may provide a selection tool that may define an area in the selected image to remove red eye. Exemplary selection tools include boxes, circles or ellipses.

The browser sends, in step 1320, a remove red eye command, an identification of the selected image, and selection data associated with the selected region to a server. In step 1325, the browser receives a URL of an image with red eye removed from the selected region. Using the received URL, the browser may display, in step 1330, an updated page that includes the image with red eye removed in selected region. Alternatively, the browser may receive, responsive to the transmission of the selection data, a page having the URL so that no separate page request is required. After displaying the updated page, the browser determines whether the user desires to remove red eye in another region of the selected image 1335. For example, the user may deselect the image when the user finished removing red eye from the image. If the browser determines that the user desires to remove red eye in another region of the selected image, then step 1315 is repeated. If the browser determines that the user does not desire to remove red eye in another region of the selected image, then the method 1200 ends.

In some implementations, more than one effect can be applied at a given time to a selected image. For example two effects can be applied to a given image at the same time with user input provided to control the application of the level of the effects. User input can be provided through a control displayed on the property bubble associated with a given effect (e.g., here an effect pair). The multiple effects can be combined in the menu presented to the user (e.g., a joint effect of saturation and brightness). Separate controls can be provided for receiving input from the user in the property bubble for each effect. Alternatively, a multi-dimensional control (e.g., a two dimensional selection tool having a picker and an associated map that maps one effect to one axis and a second effect to a second axis of the map) can be provided. Other controls are possible.

Figure 14:
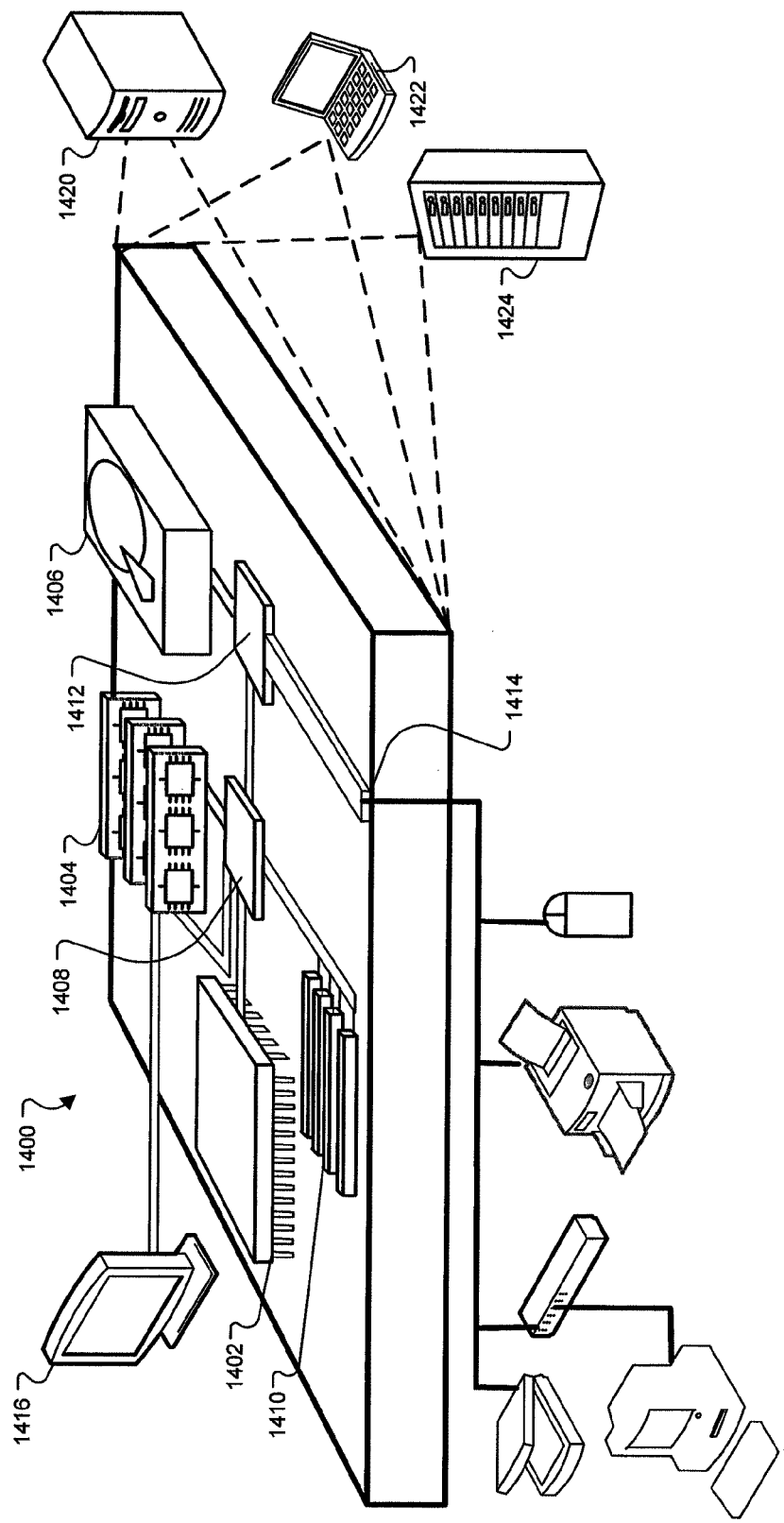
FIG. 14 is a block diagram of a computing device that can be used to implement the page creating process.

FIG. 14 is a block diagram of a computing device 1400 that may be used to implement the systems, methods, processes and tools described in this document, as either a client or as a server(s), or a combination of the two. The computing device 1400 is intended to represent various forms of digital devices, such as laptops, desktops, workstations, personal digital assistants, servers, blade servers, mainframes, or other appropriate computers or devices.

The computing device 1400 includes a processor 1402, memory 1404, a storage device 1406, a high-speed interface 1408 connecting to memory 1404 and high-speed expansion ports 1410, and a low speed interface 1412 connecting to low speed bus 1414 and storage device 1406. Each of the components 1402, 1404, 1406, 1408, 1410, and 1412, are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high speed interface 1408. In other implementations, multiple processors and/or multiple buses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is a volatile memory unit or units. In another implementation, the memory 1404 is a non-volatile memory unit or units. The memory 1404 may also be another form of computer-readable medium, such as a magnetic or optical disk.

The storage device 1406 is capable of providing mass storage for the computing device 1400. In one implementation, the storage device 1406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1404, the storage device 1406, memory on processor 1402, or a propagated signal.

The high speed controller 1408 manages bandwidth-intensive operations for the computing device 1400, while the low speed controller 1412 manages lower bandwidth-intensive operations. Such allocation of functions is exemplary only. In one implementation, the high-speed controller 1408 is coupled to memory 1404, display 1416 (e.g., through a graphics processor or accelerator), and to high-speed expansion ports 1410, which may accept various expansion cards (not shown). In the implementation, low-speed controller 1412 is coupled to storage device 1406 and low-speed expansion port 1414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1400 may be implemented in a number of different forms, as shown. For example, the computing device 1400 may be implemented as a standard server 1420, or multiple times in a group of such servers. The computing device 1400 may also be implemented as part of a rack server system 1424. In addition, the computing device 1400 may be implemented in a personal computer such as a laptop computer 1422. Each of such devices may contain one or more of computing device 1400 and an entire system may be made up of multiple computing devices 1400 communicating with each other.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the page creating process and methods have been described, it should be recognized that numerous other applications are contemplated. Further, in some implementations, the server described above may implement the same effect on a selected image using an identical function as the browser. That is, the server may produce a blend that is identical to the blend produced by the browser. Alternatively, the server may implement the transformation (e.g., effect) with a different algorithm or process, one that is not limited by the constraints that may be in place for the browser, thereby producing a better result that may be returned to the browser in response to command data (e.g., brightness data, enhancement data, etc.). In one implementation, one or more templates of effects can be presented to a user for selection. A template can include a predefined combination of transformations. In one implementation, the template can be defined by the user to allow for the creation of one or more custom templates of transformations to be applied to an image. In one implementation, the browser can include "save-as" functionality to allow for the saving of an image as transformed. Other image editing functions can be implemented in the browser including editing of image meta-data (e.g., name of photographer, camera data, date, usage rights, etc.). In one implementation, an annotation effect can be applied to images, including the placement of annotations including for example text on an image. The annotations can be blended with an underlying image as described above. In one implementation, blending can include blending an image with one or more control devices (e.g., a watermark, labels, or other access control devices). Blending can be implemented as described above. Accordingly, other embodiments are within the scope of the following claims.

What is claimed is:

1. A method comprising:
  editing, by a processor, an image including maintaining a list of transformations applied to the image including a last transformation;
  receiving a selection from a user to rollback a transformation, the selection not including the last transformation, where receiving a selection includes receiving a selection from the list of transformations that include plural selections that are not contiguous in an order in which the transformations were applied;
  generating, by the processor, a unique identifier associated with the edited image without the selection, the unique identifier including data identifying the image and all transformations to be applied to the image where the unique identifier is a uniform resource locator (URL); and
  after receiving a request for an edited image, the request including the unique identifier, transmitting the edited image to a requesting device.

2. An apparatus for editing an image comprising:
  means for rolling back transformations applied to an image in a browser;
  means for selecting one or more previously invoked transformations applied to the image, where the means for selecting is operable to select plural transformations that are not contiguous in an order in which the transformations were applied;
  means for generating a unique identifier associated with the image to include all previously applied transformations except the selected transformations, where the means for generating is operable to at each transformation, to generate a unique identifier associated with the edited image, the unique identifier including data identifying the image and all transformations to be applied to the image; and
  means for providing an edited image in response to receiving a request that includes the unique identifier,
  wherein means for generating a unique identifier includes means for generating a unique identifier that includes data identifying the image and all transformations to be applied to the image.

3. A method comprising:
  receiving at a server a selection of an image for editing, the image being presented in a browser of a client device;
  receiving edit data defining edits applied to the image at the client device;
  receiving undo data defining edits to be undone including at least two non-sequential edits in a sequence of edits that have been applied to the image as defined by the edit data; and
  undoing one or more edits applied to the image, including transmitting a modified image including edits other than the undone edits and having a unique identifier defining the combination of edits applied to the image.

4. The method of claim 3 where the unique identifier is a uniform resource locator (URL).

5. The method of claim 3 where the at least two non-sequential edits do not include a last edit applied to the image.

6. A method comprising:
  providing transformation data to a server including information defining the two or more transformations to be undone, the transformations applied to an image, the transformations to be undone being non-sequential in terms of their application to the image; and
  transmitting a modified image to a requesting device in response to receiving a request for a modified image, the request including a unique identifier that includes data identifying the image and all transformations to be applied to the image.

* * * * *